(12) United States Patent
Pan et al.

(10) Patent No.: US 10,687,386 B2
(45) Date of Patent: Jun. 16, 2020

(54) METHOD AND APPARATUS OF IMPROVING CONNECTION FOR SIDELINK COMMUNICATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW); Li-Chih Tseng, Taipei (TW); Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/675,040

(22) Filed: Nov. 5, 2019

(65) Prior Publication Data

US 2020/0154511 A1 May 14, 2020

Related U.S. Application Data

(60) Provisional application No. 62/758,398, filed on Nov. 9, 2018.

(51) Int. Cl.
*H04W 76/40* (2018.01)
*H04W 76/14* (2018.01)
*H04L 12/741* (2013.01)
*H04L 12/721* (2013.01)
*H04L 12/18* (2006.01)
*H04W 4/46* (2018.01)

(52) U.S. Cl.
CPC .......... *H04W 76/40* (2018.02); *H04L 12/184* (2013.01); *H04L 45/66* (2013.01); *H04L 45/745* (2013.01); *H04W 76/14* (2018.02); *H04W 4/46* (2018.02)

(58) Field of Classification Search
CPC ....... H04W 76/40; H04L 45/66; H04L 45/745
See application file for complete search history.

(56) References Cited

U.S. PATENT DOCUMENTS

| | | | |
|---|---|---|---|
| 2016/0192427 A1* | 6/2016 | Yun ..................... | H04L 12/189 370/329 |
| 2016/0212108 A1* | 7/2016 | Stojanovski ............ | H04L 67/04 |
| 2017/0181206 A1* | 6/2017 | Lee ........................ | H04W 76/14 |
| 2018/0035477 A1* | 2/2018 | Van Phan ............. | H04W 76/14 |
| 2018/0113521 A1* | 4/2018 | Lai ...................... | G06F 3/03543 |
| 2018/0198767 A1* | 7/2018 | Choi ................... | H04L 61/6022 |

(Continued)

OTHER PUBLICATIONS

3GPP TS 23.303 V15.1.0 (Jun. 2018) 3rd Generation Partnership Project; Technical Specification Group Services and System Aspects; Proximity-based services (ProSe); Stage 2 (Release 15) (Year: 2018).*

(Continued)

*Primary Examiner* — Gary Mui
(74) *Attorney, Agent, or Firm* — Blue Capital Law Firm, P.C.

(57) ABSTRACT

A method and apparatus are disclosed from the perspective of a first device. In one embodiment, the method includes the first device broadcasting a first message, wherein the first message is used to request the unicast link establishment, and the first message includes an upper layer identifier of the first device. The method also includes the first device receiving a second message from a second device for completing the unicast link establishment, wherein the second message includes an upper layer identifier of the second device.

12 Claims, 19 Drawing Sheets

(56) References Cited

U.S. PATENT DOCUMENTS

| | | | | |
|---|---|---|---|---|
| 2018/0199229 | A1* | 7/2018 | Lee | H04W 76/00 |
| 2019/0058986 | A1* | 2/2019 | Loehr | H04L 1/1887 |
| 2019/0182639 | A1* | 6/2019 | Basu Mallick | H04W 4/40 |
| 2019/0223008 | A1* | 7/2019 | Vanderveen | H04B 7/0417 |
| 2019/0223231 | A1* | 7/2019 | Muraoka | H04W 92/18 |

OTHER PUBLICATIONS

3GPP TR 23.713 V13.0.0 (Sep. 2015) 3rd Generation Partnership Project;Technical Specification Group Services and System Aspects; Study on extended architecture support for proximity-based services (Release 13) (Year: 2015).*

Asadi, A.; Mancuso, V. WiFi Direct and LTE D2D in action. In Proceedings of the 2013 IFIP Wireless Days (WD), Valencia, Spain, Nov. 13-15, 2013; pp. 1-8.

Gandotra, Pimmy, and Rakesh Kumar Jha. "Device-to-Device Communication in Cellular Networks: A Survey." Journal of Network and Computer Applications 71 (2016): 99-117.

"3rd Generation Partnership Project; Technical Specification Group Core Network and Terminals; User Equipment (UE) to V2X control function; protocol aspects; Stage 3 (Release 14)", 3GPP Standard ; Technical Specification ; 3GPP TS 24.386, 3rd Generation Partnership Project (3GPP), Mobile Competence Centre ; 650, Route Des Lucioles ; F-06921 Sophia-Antipolis Cedex ; France, vol. CT WG1, No. V2.0.0, Mar. 1, 2017 (Mar. 1, 2017), pp. 1-33, XP051290346.

"3rd Generation Partnership Project; Technical Specification Group Services and System Aspects; Study on architecture enhancements for EPS and 5G System to support advanced V2X services (Release 16)", 3GPP Standard; Technical Report; 3GPP TR 23.786, 3rd Generation Partnership Project (3GPP), Mobile Competence Centre ; 650, Route Des Lucioles ; F-06921 Sophia-Antipolis Cedex ; France, vol. SA WG2, No. V0.9.0, Oct. 26, 2018 (Oct. 26, 2018), pp. 1-91, XP051487695.

"3rd Generation Partnership Project; Technical Specification Group Services and System Aspects; Proximity-based services (ProSe); Stage 2 (Release 15)", 3GPP Draft; 23303-F10_CR_Implemented, 3rd Generation Partnership Project (3GPP), Mobile Competence Centre ; 650, Route Des Lucioles ; F-06921 Sophia-Antipolis Cedex ; France Jun. 18, 2018 (Jun. 18, 2018), XP051535215.

Zte: "Support of unicast and groupcast in NR Sidelink", 3GPP Draft; R2-1814174 Support of Unicast and Groupcast in NR SI DELINK_V1.1, 3rd Generation Partnership Project (3GPP), Mobile Competence Centre ; 650, Route Des Lucioles ; F-06921 Sophia-Antipolis CE vol. RAN WG2, No. Chengdu, China; 20181008-20181012 Sep. 28, 2018 (Sep. 28, 2018), XP051523630.

European Search Report in corresponding EP Application No. 19207023.3, dated Mar. 16, 2020.

* cited by examiner

METHOD AND APPARATUS OF IMPROVING CONNECTION FOR SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. No. 62/758,398 filed on Nov. 9, 2018, the entire disclosure of which is incorporated herein in its entirety by reference.

FIELD

This disclosure generally relates to wireless communication networks, and more particularly, to a method and apparatus of improving connection for sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device. In one embodiment, the method includes the first device broadcasting a first message, wherein the first message is used to request the unicast link establishment, and the first message includes an upper layer identifier of the first device. The method also includes the first device receiving a second message from a second device for completing the unicast link establishment, wherein the second message includes an upper layer identifier of the second device.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 24.386 V15.1.0, "User Equipment (UE) to V2X control function; protocol aspects; Stage 3 (Release 15)"; RAN1#94 Chairman's Note; TR 23.786 V0.9.0, "Study on architecture enhancements for EPS and 5G System to support advanced V2X services (Release 16); TS 23.303 V15.1.0, "Proximity-based services (ProSe); Stage 2 (Release 15)"; TR 22.886 V15.0.0, "Study on enhancement of 3GPP Support for 5G V2X Services (Release 15)"; R2-1812975, RAN2#013 Meeting, "LS on Prioritised Use Cases and Requirements for consideration in Rel-16 NR-V2X", 5GAA WG1; and R2-1815440, RAN2#103bis Meeting, "Basic Scenarios and Overall Steps for NR Sidelink design", LG Electronics Inc. The standards and documents listed above are hereby expressly incorporated by reference in their entirety.

Figure 1:
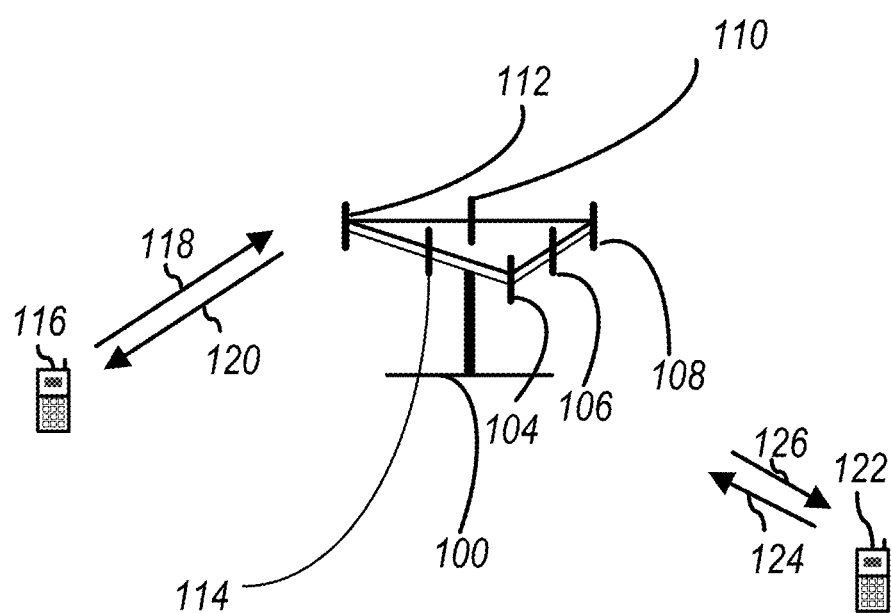
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
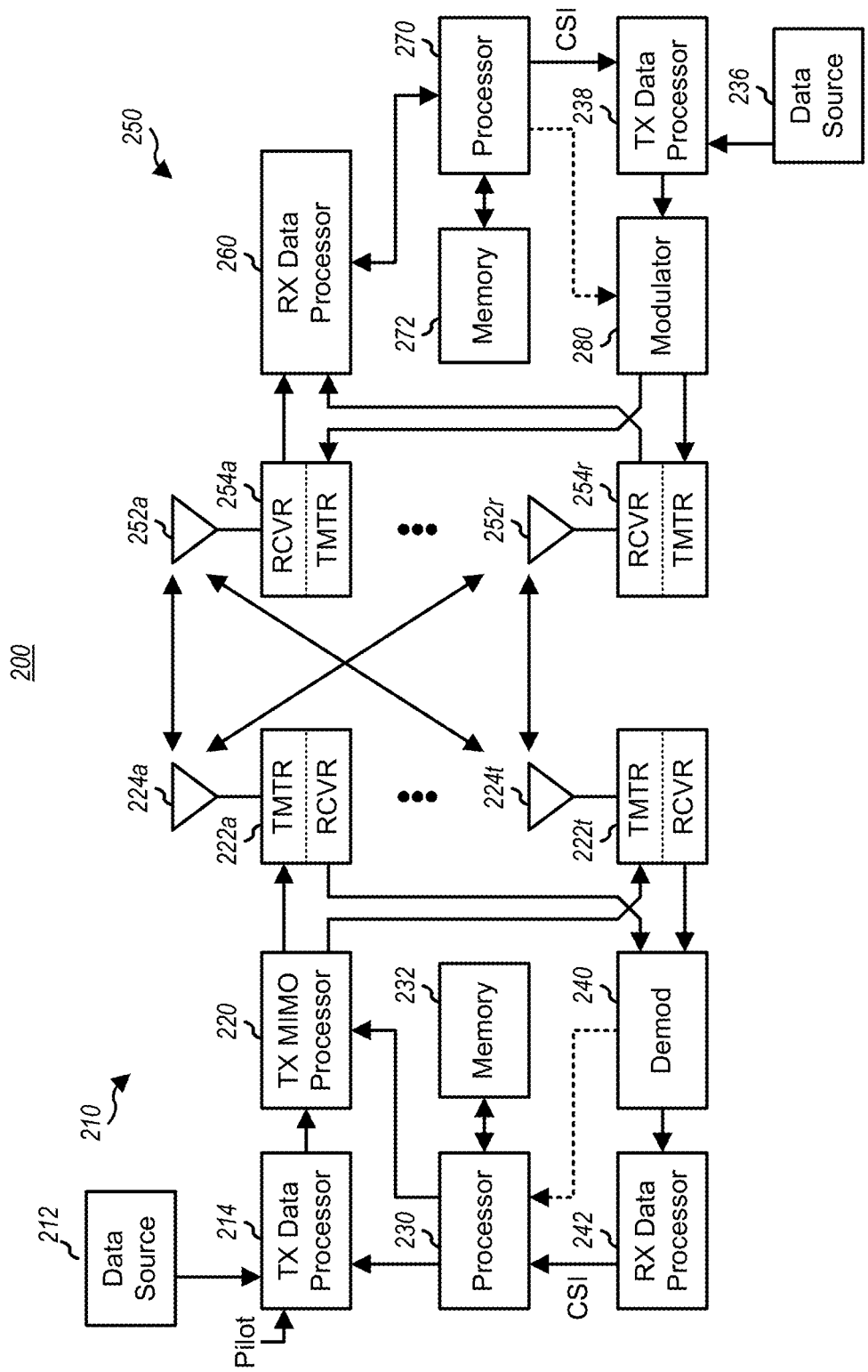
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
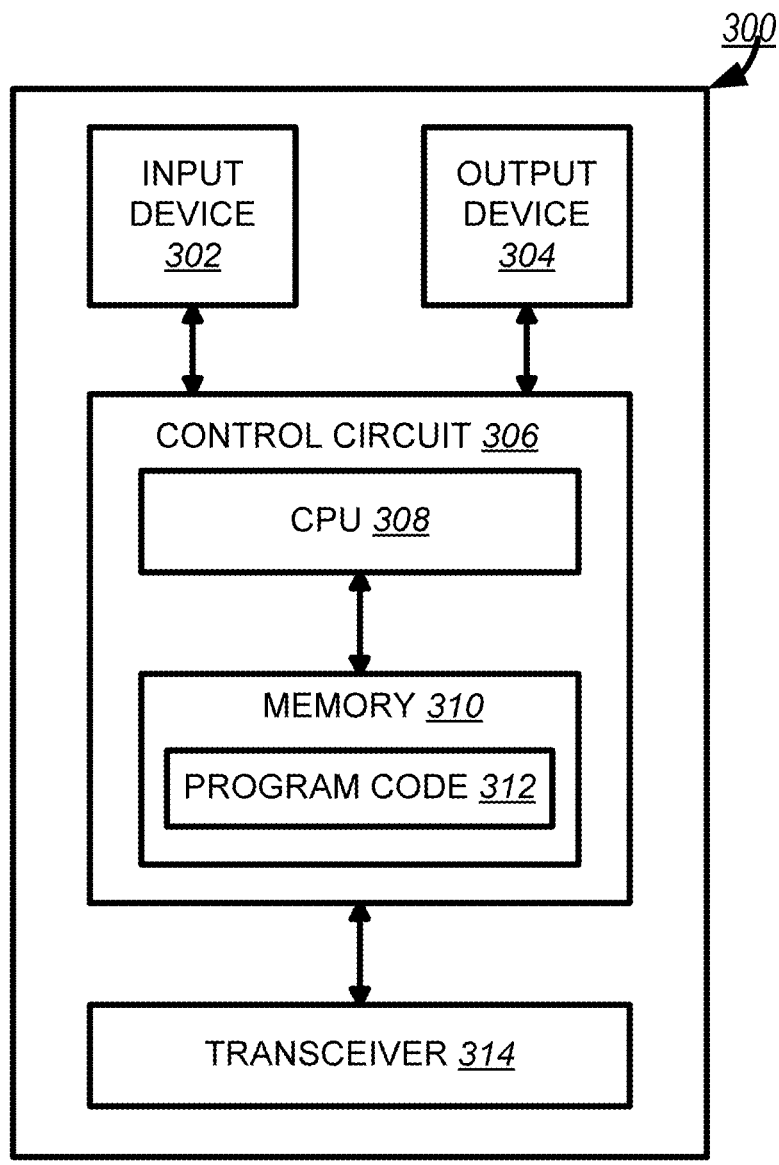
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
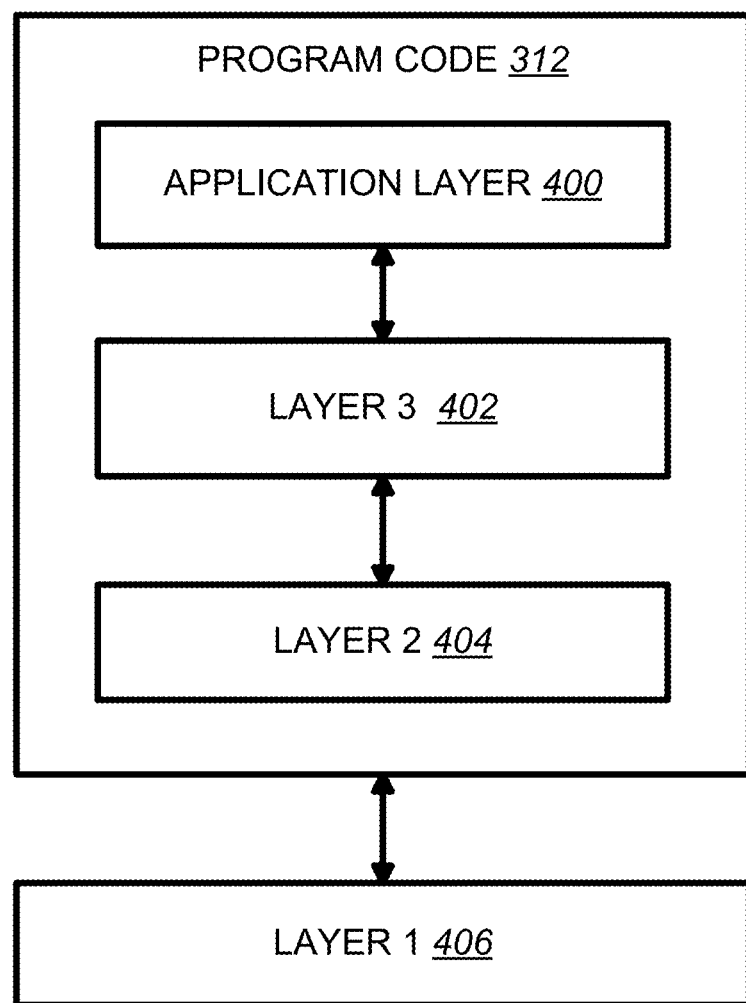
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In LTE (as discussed in 3GPP TS 24.386), a configuration parameters and transmission behaviors related to transmission profile, destination layer-2 ID, and source layer-2 ID are described as follows:

5.2.4 Configuration Parameters for V2X Communication Over PC5

The configuration parameters for V2X communication over PC5 consist of:
- a) an expiration time for the validity of the configuration parameters for V2X communication over PC5;
- b) a list of PLMNs in which the UE is authorized to use V2X communication over PC5 when the UE is served by E-UTRAN for V2X communication;
- c) an indication of whether the UE is authorized to use V2X communication over PC5 when the UE is not served by E-UTRAN for V2X communication;
- d) per geographical area:
  1) radio parameters for V2X communication over PC5 applicable when the UE is not served by E-UTRAN for V2X communication and is located in the geographical area, with an indication of whether these radio parameters are "operator managed" or "non-operator managed";
- e) a list of the V2X services authorized for V2X communication over PC5. Each entry of the list contains:
1) a V2X service identifier; and
2) a destination Layer-2 ID;
- f) PPPP to PDB mapping rules between the ProSe Per-Packet Priority (PPPP) and the Packet Delay Budget (PDB) for V2X communication over PC5;
- g) optionally, a default destination Layer-2 ID;
- h) optionally, a configuration for the applicability of privacy for V2X communication over PC5, containing:
1) a T5000 timer indicating how often the UE shall change the source Layer-2 ID and source IP address (for IP data) self-assigned by the UE for V2X communication over PC5; and
2) a list of the V2X services which require privacy for V2X communication over PC5. Each entry in the list contains:
  A) a V2X service identifier; and
  B) optionally, one or more associated geographical areas;
- i) optionally, V2X service identifier to V2X frequency mapping rules between the V2X service identifiers and the V2X frequencies with associated geographical areas for V2X communication over PC5; and
- j) optionally, a list of the V2X services authorized for ProSe Per-Packet Reliability (PPPR). Each entry of the list contains a V2X service identifier and a ProSe Per-Packet Reliability (PPPR) value; and
- k) optionally, V2X service identifier to Tx Profile mapping rules between the V2X service identifiers and the Tx Profile for V2X communication over PC5.

[ . . . ]

6.1.2.2 Transmission

The UE shall include the V2X message in a protocol data unit and pass it to the lower layers for transmission along with the following parameters:
- a) a Layer-3 protocol data unit type (see 3GPP TS 36.323 [8]) set to:
  1) IP packet, if the V2X message contains IP data; or
  2) non-IP packet, if the V2X message contains non-IP data;
- b) the source Layer-2 ID set to the Layer-2 ID self-assigned by the UE for V2X communication over PC5;
- c) the destination Layer-2 ID set to:
  1) the destination Layer-2 ID associated with the V2X service identifier of the V2X service in this list of V2X services authorized for V2X communication over PC5 as specified in subclause 5.2.4, if the V2X service identifier of the V2X service is included in the list of V2X services authorized for V2X communication over PC5 as specified in subclause 5.2.4; or
  2) the default destination Layer-2 ID configured to the UE for V2X communication over PC5 as specified in subclause 5.2.4, if the V2X service identifier of the V2X service is not included in the list of V2X services authorized for V2X communication over PC5 and the UE is configured with a default destination Layer-2 ID for V2X communication over PC5;
- d) if the V2X message contains non-IP data, an indication to set the non-IP type field of the non-IP type PDU to the value corresponding to the V2X message family (see subclause 7.1) used by the V2X service as indicated by upper layers;
- e) if the V2X message contains IP data, the source IP address set to the source IP address self-assigned by the UE for V2X communication over PC5;
- f) the ProSe Per-Packet Priority set to the value corresponding to the V2X message priority received from upper layers. The mapping of V2X message priority to ProSe Per-Packet Priority is configured on the UE and is out of the scope of this specification;
- g) if the UE is configured with PDB (Packet Delay Budget)-to-ProSe Per-Packet Priority mapping rules for V2X communication over PC5 as specified in subclause 5.2.4, the PDB associated with the ProSe Per-Packet Priority as specified in subclause 5.2.4;
- h) if:
  1) a ProSe Per-Packet Reliability (PPPR) value is received from the upper layers; and
  2) one of the following conditions is met:
    A) the list of the V2X services authorized for ProSe Per-Packet Reliability (PPPR) is not configured; or
    B) the V2X service identifier of the V2X service for the V2X message and the received ProSe Per-Packet Reliability (PPPR) value are included in an entry of the list of the V2X services authorized for ProSe Per-Packet Reliability (PPPR);
  then the ProSe Per-Packet Reliability (PPPR) value; and
- i) if the UE is configured with V2X service identifier to Tx Profile mapping rules for V2X communication over PC5 as specified in subclause 5.2.4, the Tx Profile associated with the V2X service identifier as specified in subclause 5.2.4.

If the UE has an emergency PDN connection, the UE shall send an indication to the lower layers to prioritize transmission over the emergency PDN connection as compared to transmission of V2X communication over PC5.

In the RAN1#94 Chairman's Note, the agreements of NR V2X are described as follows:

Agreements:
  At least two sidelink resource allocation modes are defined for NR-V2X sidelink communication
    Mode 1: Base station schedules sidelink resource(s) to be used by UE for sidelink transmission(s)
    Mode 2: UE determines (i.e. base station does not schedule) sidelink transmission resource(s) within sidelink resources configured by base station/network or pre-configured sidelink resources Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)
    c) UE is configured with NR configured grant (type-1 like) for sidelink transmission
    d) UE schedules sidelink transmissions of other UEs
  RAN1 to continue study details of resource allocation modes for NR-V2X sidelink communication 3GPP TR 23.786 provides the following description:

6.11.3 Procedures 6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.
  The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.
  FFS: A special value used to indicate purpose of unicast and/or groupcast connection could be set to Destination ID field in MAC header. Alternatively, a field in SCI could be used to indicate if content of data associated with the SCI includes a Direct Communication Request.
  FFS: A special logical channel for transmission/reception of the Direct Communication Request may be needed.
  The Direct Communication Request message should be transmitted using default AS layer setting e.g. broadcast setting, that can be understood by UE-2.
  UE-2 uses the source L2 ID of the received Direct Communication Request message as destination L2 ID in the subsequent signalling to UE-1, and using its own unicast L2 ID as the source L2 ID. UE-1 obtains UE-2's L2 ID for future communication, for signalling and data traffic.

Section 5.4.5.23 in 3GPP TS 23.303 provides the following description:

5.4.5.2 Establishment of Secure Layer-2 Link Over PC5

Figure 5:
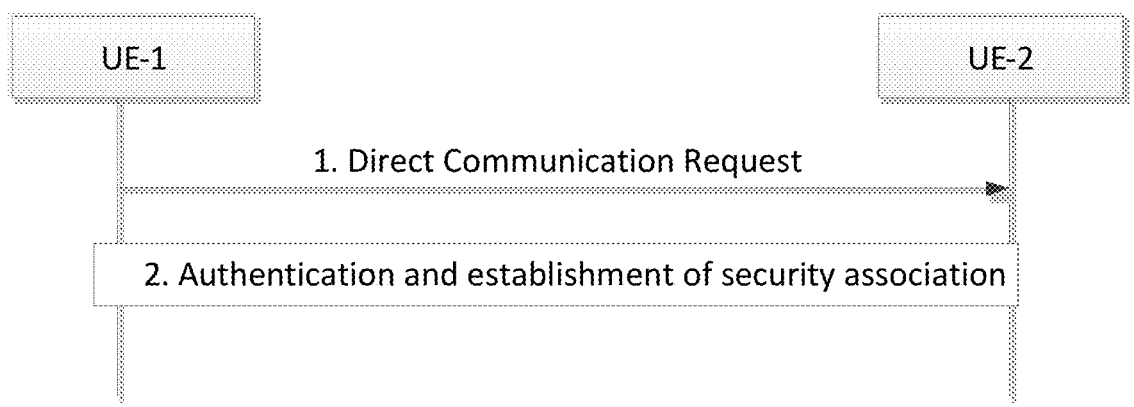
FIG. 5 is a reproduction of FIG. 5.4.5.2-1 of 3GPP TS 23.303 V15.1.0.

Depicted in FIG. 5.4.5.2-1 is the procedure for establishment of secure layer-2 link over PC5.

UEs engaged in isolated (non-relay) one to one communication negotiate IP address allocation mechanisms and optionally exchange link-local IPv6 addresses if needed during the link establishment procedure.

[FIG. 5.4.5.2-1 of 3GPP TS 23.303 V15.1.0, Entitled "Establishment of Secure Layer-2 Link Over PC5", is Reproduced from FIG. 5]

1. UE-1 sends a Direct Communication Request message to UE-2 in order to trigger mutual authentication. This message includes the User Info.
   If the link is setup for isolated one-to-one communication (none of the UEs is a relay), UE-1 shall indicate in the message whether it can act as a DHCPv4 server, IPv6 router, or both. If UE-1 does not support any of the IP address allocation mechanisms, it shall include a link-local IPv6 address in the message.
   NOTE 1: The link initiator (UE-1) needs to know the Layer-2 ID of the peer (UE-2) in order to perform step 1. As an example, the link initiator can learn the Layer-2 ID of the peer by executing a discovery procedure first or by having participated in one-to-many ProSe Direct Communication including the peer.
2. UE-2 initiates the procedure for mutual authentication. The successful completion of the authentication procedure completes the establishment of the secure layer-2 link over PC5. As part of this step, UE-2 includes the User Info in a response to UE-1.
   If the link is setup for isolated one-to-one communication (none of the UEs is a relay), UE-2 shall indicate to UE-1 in the response message whether it can act as a DHCPv4 server, IPv6 router, or both. If UE-2 does not support any of the IP address allocation mechanisms and UE-1 included a link-local IPv6 address in step 1, UE-2 shall include a non-conflicting link-local IPv6 address in the response message.
   If both UE-1 and UE-2 selected to use link-local IPv6 address, they shall disable the duplicate address detection defined in RFC 4862 [6].
   NOTE 2: When either UE-1 or UE-2 indicates the support of DHCPv4 or IPv6 router, corresponding address configuration procedure would be carried out after the establishment of the layer 2 link, and the link-local IPv6 addresses are ignored.
   NOTE 3: In order to use link-local IPv6 addresses the applications using isolated one-to-one ProSe Direct Communication use application layer identifiers that are compatible with Multicast DNS as specified in RFC 6762 [34]. In order to make use of the mDNS, the upper layer need to be aware of the use of link-local address over the L2 link, as the FQDN used for it would be different.

3GPP TR 22.886 provides the following description:

5.20 Emergency Trajectory Alignment 5.20.1 Description 5.20.1.1 General

Emergency Trajectory Alignment (EtrA) messages complement cooperative automated driving [31]. Manoeuvre cooperation through EtrA has been invented to assist the driver in hazardous and challenging driving situations to further increase traffic safety [31].

EtrA messages cover sensor data and status information with specific information for cooperative evasive manoeuvre coordination to bring more security in case of unexpected road conditions:

When a vehicle obtains from on-board sensors the information about obstacles on the road (e.g. pedestrians on the road, loss of goods, deer crossing), it calculates the manoeuvre to avoid an accident.

This vehicle then informs other vehicles (via 3GPP V2X communication service) about the safety-critical situation immediately. An important reliability of message transfer is expected to support the safety aspect of this information.

Vehicles in proximity start to align trajectories to perform the emergency reaction cooperatively.

The following Key Performance Indicators (KPIs) are expected:

Less than 3 ms guaranteed end-to-end latency for cooperative manoeuvre planning within the application time limit [30] [20].

Throughput of 30 Mbps to exchange messages with 90 kb between vehicles with sensor and trajectory data (0.3 m resolution [30], 100 way-points per trajectory, 50 trajectories per message plus sensor data).

99.999% reliability [31] to avoid trajectory miscalculation on the application layer in safety-critical situation within 500 m communication range [20].

5.20.1.1 Pre-Conditions

Vehicle A, B, C and D supports 3GPP V2X communication.

Vehicle A, B, C and D supports EtrA on the application.

Vehicle A detects an obstacle on the road with on-board sensors.

Vehicle A calculates the driving manoeuvre to avoid crashing without posing a risk to other road users.

5.20.1.2 Service Flows

Vehicle A informs B, C and D about the need of immediate trajectory re-calculation via 3GPP V2X communication service.

After detecting and informing involved vehicles about trajectory re-calculation, vehicles A, B, C, D calculate possible trajectories and transmit them to all involved vehicles via 3GPP V2X communication service.

Vehicle A, B, C, D decodes, verifies and evaluates trajectories via known algorithm on application layer and sends message with selected trajectories via 3GPP V2X communication service.

Vehicle A, B, C and D sends messages via 3GPP V2X communication service to confirm on commonly selected trajectories for each vehicle.

Vehicle A, B, C, D sends messages with re-calculated and selected trajectories regularly via 3GPP V2X communication service.

5.20.1.3 Post-Conditions

Temporary evasive manoeuvre group performs driving manoeuvre.

Temporary evasive manoeuvre group finishes sending EtrA messages via 3GPP V2X communication service after the manoeuvre is performed completely and terminated.

5.20.2 Potential Requirements

[PR.5.20-001] The 3GPP network shall enable communication between UEs with data rate [30] Mbps, less than [3] ms end-to-end latency and [99.999] % reliability within communication range of [500] m.

NOTE: The purpose of the requirement is to be able to provide very fast feedback.

In general, 5G Automotive Association raises 10 prioritized use cases and requirements for consideration in Rel-16 NR-V2X (as discussed in 3GPP R2-1812975). In use case "Cooperative Manoeuvers of Autonomous Vehicles for Emergency Situations", an autonomous vehicle identifies a dangerous situation (e.g., collision with a moving object) and undertakes to coordinate with neighboring vehicles so that they can jointly decide and perform their maneuvers to avoid the collision.

Figure 6:
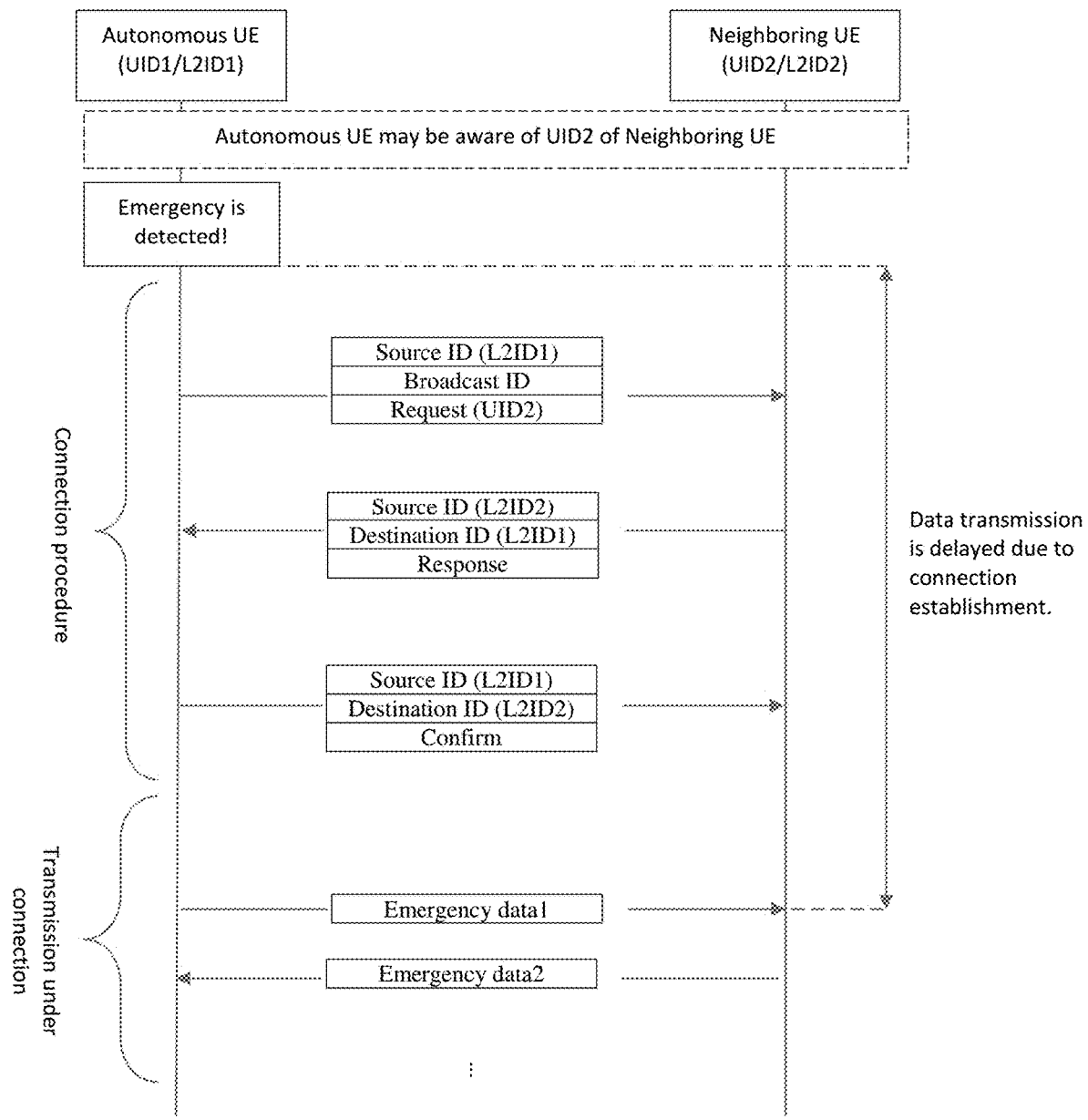
FIG. 6 is a diagram according to one exemplary embodiment.

As discussed of 3GPP R2-1815440, V2X (Vehicle-to-Everything) sidelink discovery in NR could be supported for discovering another UE in proximity to initiate data transmission between or among UEs in unicast or groupcast V2X communication. If this autonomous vehicle initiates a V2X sidelink discovery procedure to identify neighboring vehicles when detecting the emergency situation, it will induce extra latency and thus increase the risk of collision. Based on 3GPP TR 23.786, a service flow for an autonomous vehicle detecting emergency event could be illustrated in FIG. 6. FIG. 6 supposes that the autonomous vehicle could be aware of the UID2 of a neighboring vehicle before the emergency event occurs. When the autonomous vehicle detects the emergency event which needs to send V2X messages (emergency data) immediately, it may transmit a first message to the neighboring vehicle where the first message may be transmitted based on a destination address for which the neighboring vehicle could understand this first message is used to request establishing a connection with the autonomous vehicle. This first message could include a direct request message for the connection establishment. Upon reception of the first message, the neighboring vehicle could transmit a second message to the autonomous vehicle based on e.g. the emergency data included in the first message or the direct request message. The second message could include a direct response message for the connection establishment. Upon reception of the second message, the autonomous vehicle could transmit a third message to confirm the neighboring vehicle that the second message was received. The third message could include a direct confirmation message for the connection establishment. After the connection establishment had been completed, the autonomous vehicle and the neighboring vehicle start communication based on negotiation result of the connection establishment. Such V2X messages or emergency data could be user plane traffic transmitted on sidelink radio bearer.

Other faster solutions could be considered to reduce the risk.

Solution 1: Traffic and a Message Used for Connection Establishment could be Transmitted at the Same Time When the autonomous vehicle detects the emergency event, the autonomous vehicle could have emergency data available for transmission. As discussed in 3GPP TR 23.786, the autonomous vehicle could initialize a transmission of the direct request message to the neighboring vehicle. At this moment, the autonomous vehicle could not know the L2ID of the neighboring vehicle. Based on the sidelink operation in LTE [xx], a SLRB should be created or established for a pair of a L2ID (Layer-2 Identity) of a source device and a L2ID of a destination device before transmitting a traffic on the SLRB (Sidelink Radio Bearer). If 5G V2X sidelink operation following the principle of the sidelink operation in LTE, a SLRB used for transmitting the emergency data could not be created or established because no pair of the L2ID of the autonomous vehicle and the L2ID of the neighboring vehicle can be associated with the SLRB. In this situation, the emergency data could not be transmitted on the SLRB. To transmit the emergency data, following method could be used:

- the emergency data could be transmitted/included in (a container of) a direct request message, where the direct request message could be used for establishing a connection; and/or
- the emergency data could be transmitted/included in (a container of) a direct response message, where the direct response message could be used for establishing a connection; and/or
- the emergency data could be transmitted/included in (a container of) a direct confirmation message, where the direct confirmation message could be used for establishing a connection; and/or
- the emergency data could be included in a packet which also includes a direct request message, where the direct request message could be used for establishing a connection, and the packet is transmitted for establishing the connection; and/or
- the emergency data could be included in a packet which also includes a direct response message, where the direct response message could be used for establishing a connection, and the packet is transmitted for establishing the connection; and/or
- the emergency data could be included in a packet which also includes a direct confirmation message, where the direct confirmation message could be used for establishing a connection, and the packet is transmitted for establishing the connection.

Figure 7:
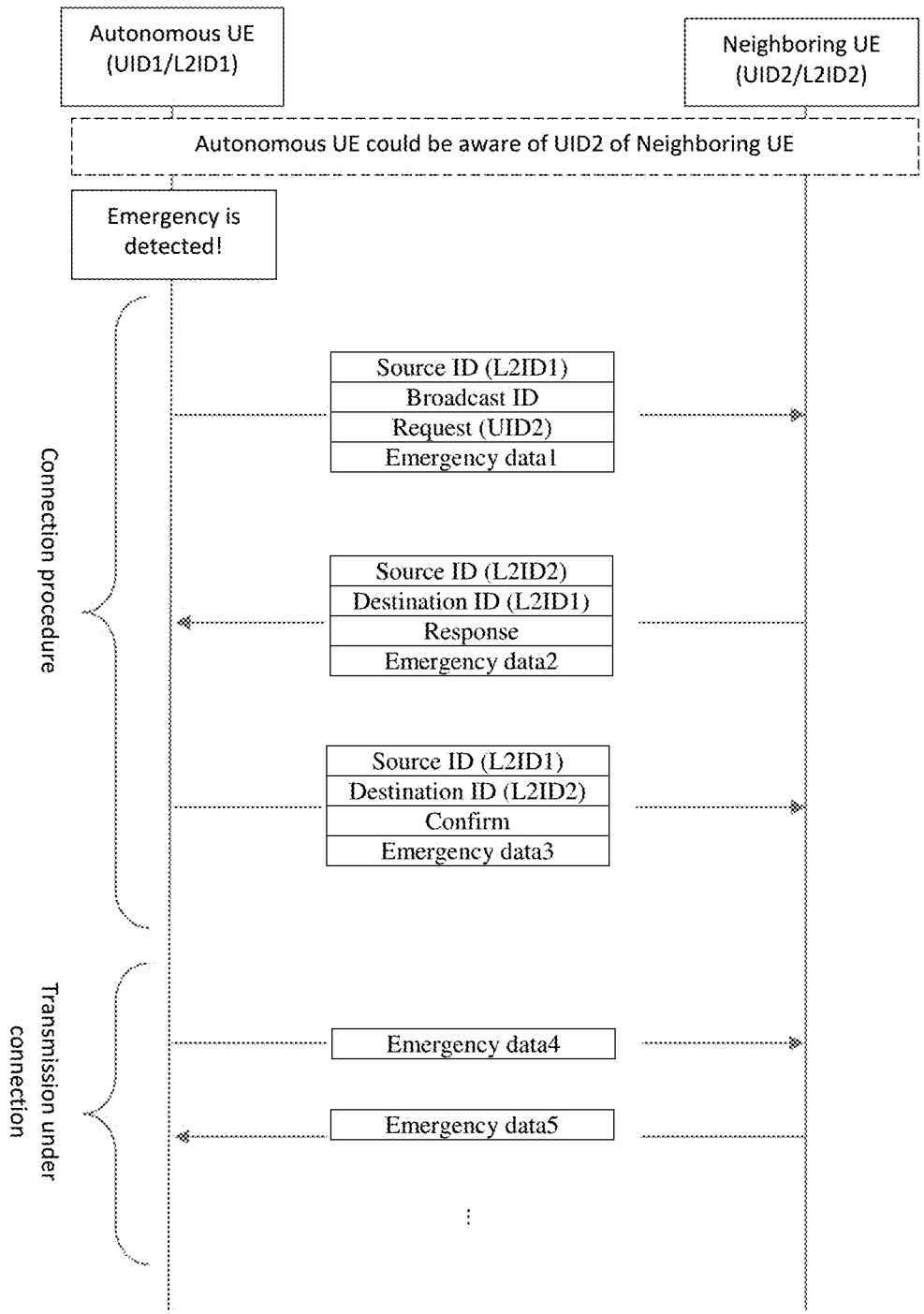
FIG. 7 is a diagram according to one exemplary embodiment.

An example of service flow for Solution 1 could be illustrated in FIG. 7. Furthermore, FIGS. 8 and 9, and their description below are exemplary embodiments of Solution 1.

Figure 8:
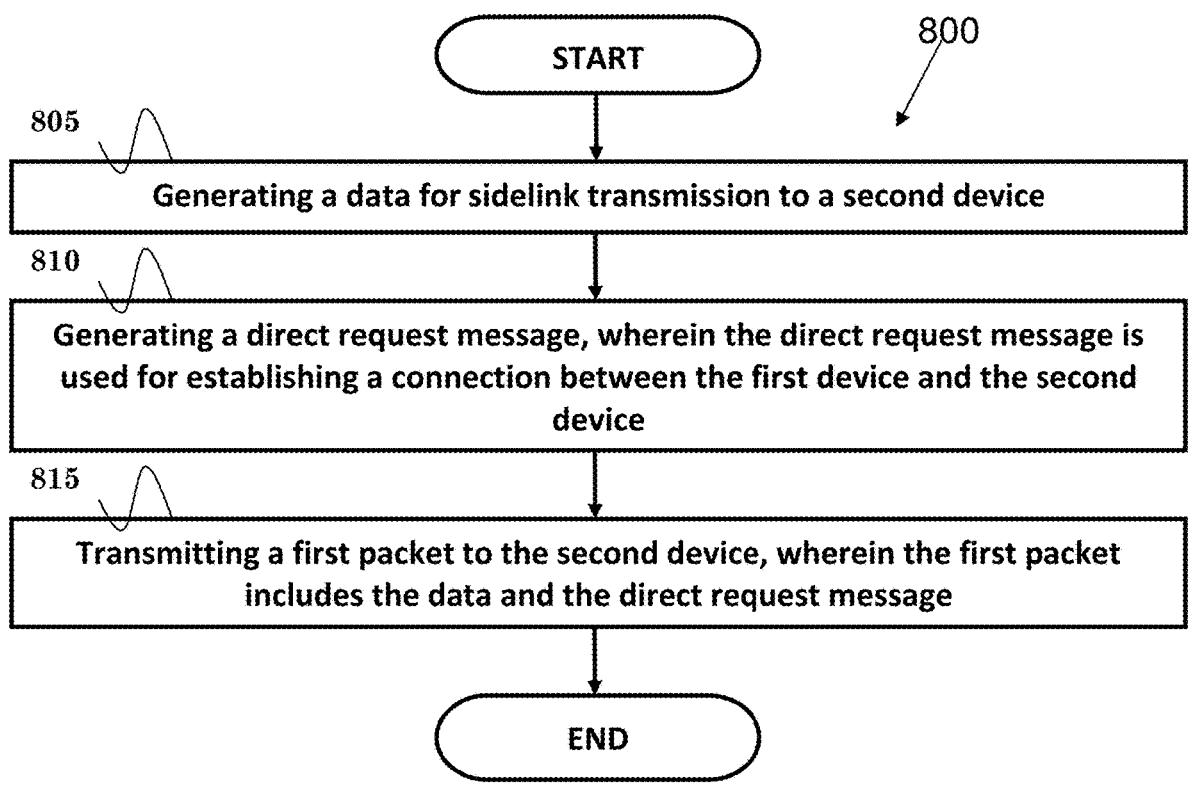
FIG. 8 is a flow chart according to one exemplary embodiment.

FIG. 8 is a flow chart 800 according to one exemplary embodiment from the perspective of a first device to perform sidelink communication. In step 805, the first device generates a data for sidelink transmission to a second device. In step 810, the first device generates a direct request message, wherein the direct request message is used for establishing a connection between the first device and the second device. In step 815, the first device transmits a first packet to the second device, wherein the first packet includes the data and the direct request message.

In one embodiment, the first packet could be transmitted based on a Layer2 identity of the first device and a broadcast address which is a Layer2 identity used for establishing the connection between the first device and the second device. The direct request message could include an upper layer identity of the second device.

In one embodiment, the first device could receive a second packet from the second device, wherein the second packet includes a direct response message used for establishing the connection between the first device and the second device. The second packet could be transmitted based on the Layer2 identity of the first device and a Layer2 identity of the second device. The direct response message could be in response to reception of the direct request message. The data could be included in the direct request message, or in a container associated with the direct request message.

Referring back to FIGS. 3 and 4, in one exemplary embodiment of a first device, the device 300 includes a program code 312 stored in the memory 310. The CPU 308 could execute program code 312 to enable the device (i) to generate a data for sidelink transmission to a second device, (ii) to generate a direct request message, wherein the direct request message is used for establishing a connection between the first device and the second device, and (iii) to transmit a first packet to the second device, wherein the first packet includes the data and the direct request message. Furthermore, the CPU 308 can execute the program code 312 to perform all of the above-described actions and steps or others described herein.

Figure 9:
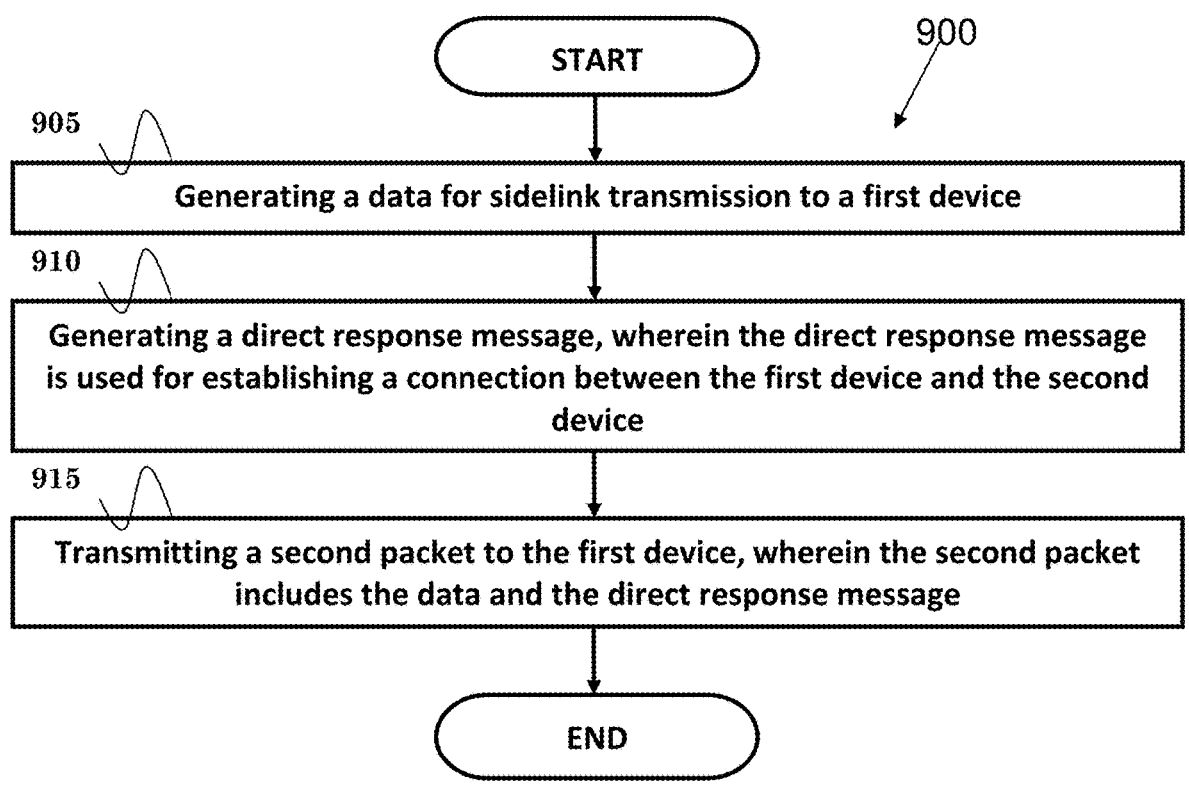
FIG. 9 is a flow chart according to one exemplary embodiment.

FIG. 9 is a flow chart 900 according to one exemplary embodiment from the perspective of a second device to perform sidelink communication. In step 905, the second device generates a data for sidelink transmission to a first device. In step 910, the second device generates a direct response message, wherein the direct response message is used for establishing a connection between the first device and the second device. In step 915, the second device transmits a second packet to the first device, wherein the second packet includes the data and the direct response message.

In one embodiment, the second packet could be transmitted based on a Layer2 identity of the first device and a Layer2 identity of the second device. The direct response message could include an upper layer identity of the second device.

In one embodiment, the second device could receive a first packet from the first device, wherein the first packet includes a direct request message used for establishing the connection between the first device and the second device. The first packet could be transmitted based on the Layer2 identity of the first device and a broadcast address which is a Layer2 identity used for establishing the connection between the first device and the second device. The direct response message could be in response to reception of the direct request message. The data could be included in the direct response message, or in a container associated with the direct response message.

Referring back to FIGS. 3 and 4, in one exemplary embodiment of a second device, the device 300 includes a program code 312 stored in the memory 310. The CPU 308 could execute program code 312 to enable the second device (i) to generate a data for sidelink transmission to a first device, (ii) to generate a direct response message, wherein the direct response message is used for establishing a connection between the first device and the second device, and (iii) to transmit a second packet to the first device, wherein the second packet includes the data and the direct response message. Furthermore, the CPU 308 can execute the program code 312 to perform all of the above-described actions and steps or others described herein.

Solution 2: Connection Establishment can be Done Before Traffic has Become Available for Transmission If the autonomous vehicle cannot know the upper layer identity of the neighboring vehicle, the autonomous vehicle cannot include any upper layer identity for a neighboring vehicle. Instead, the autonomous vehicle may need to periodically broadcast its direct request message including its upper layer identity. When a neighboring vehicle is in proximity of the autonomous vehicle and it receives the direct request message, the neighboring vehicle could start a procedure of establishing a connection with the autonomous vehicle. After the connection has been done, when the emergency event occurs on the autonomous vehicle, the autonomous vehicle can immediately transmit the emergency data to the neighboring vehicle using the connection configuration.

Figure 10:
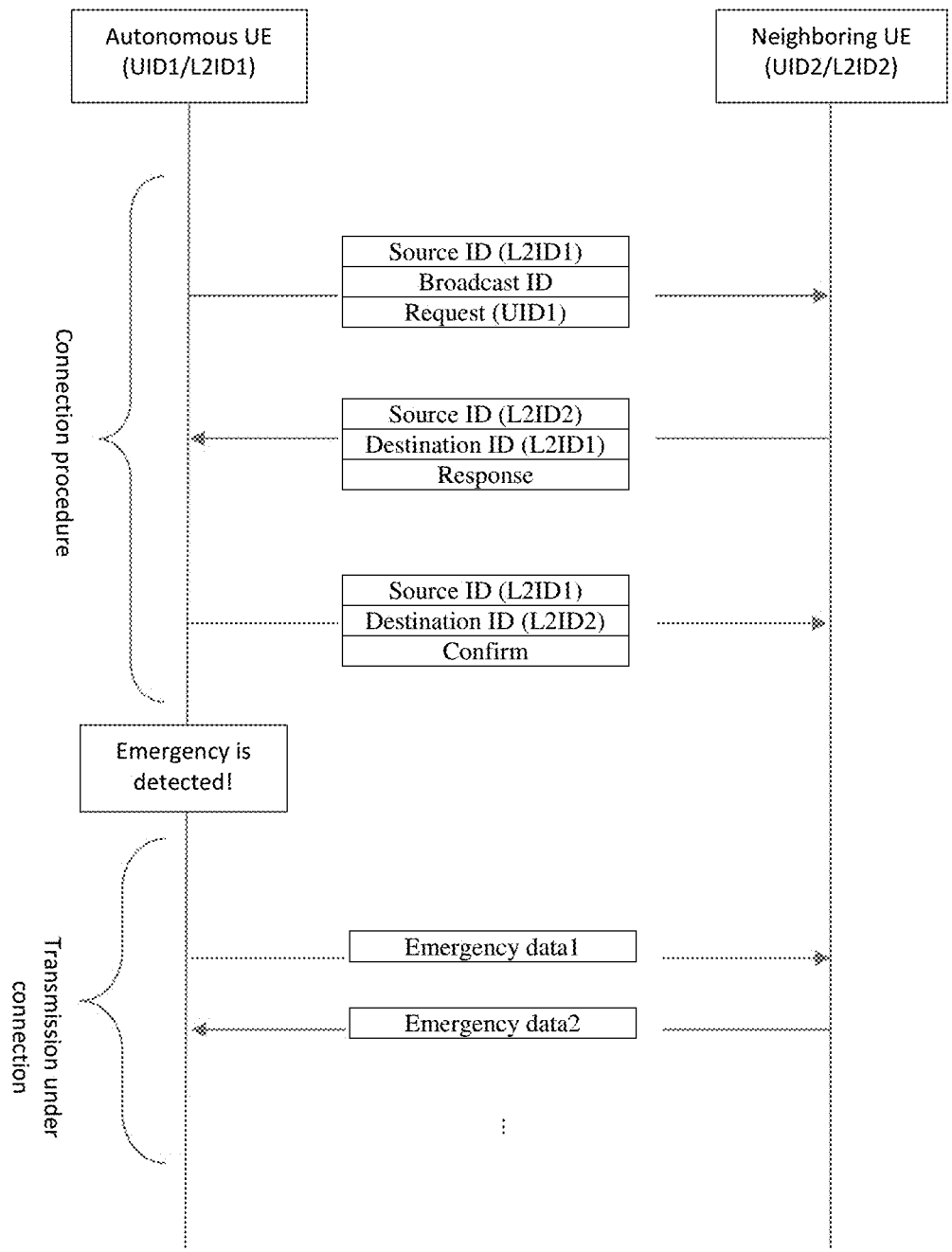
FIG. 10 is a diagram according to one exemplary embodiment.

An example of service flow for this solution could be illustrated in FIG. 10. The autonomous vehicle could broadcast a direct request message using a L2ID of the autonomous vehicle and a broadcast address. In the direct request message, an upper identifier of the autonomous vehicle could be included. The upper identifier of the autonomous vehicle could be used for the neighboring vehicle to associate the upper identifier of the autonomous vehicle with the L2ID of the autonomous vehicle. The neighboring vehicle could associate the upper identifier of the autonomous vehicle with the L2ID of the autonomous vehicle when/if the direct request message is received.

Upon reception of the direct request message, the neighboring vehicle could initialize a transmission of a direct response message corresponding to the direct request message. The direct response message could include an upper identifier of the neighboring vehicle. The upper identifier of the neighboring vehicle could be used for the autonomous vehicle to associate the upper identifier of the neighboring vehicle with a L2ID of the neighboring vehicle. The autonomous vehicle could associate the upper identifier of the neighboring vehicle with the L2ID of the neighboring vehicle when/if the direct response message is received. The neighboring vehicle could transmit the direct response message based on the L2ID of the autonomous vehicle and the L2ID of the neighboring vehicle.

Upon reception of the direct response message, the autonomous vehicle could initialize a transmission of a direct confirmation message corresponding to the direct response message. The autonomous vehicle could transmit the direct confirmation message to the neighboring vehicle based on the L2ID of the autonomous vehicle and the L2ID of the neighboring vehicle.

In case the emergency even occurs, the autonomous vehicle and the neighboring vehicle could transmit the emergency data based on configuration result of the connection establishment. For example, when the emergency data is received from upper layers on the autonomous vehicle, the emergency data could be transited together with the upper identifier of the neighboring vehicle. The autonomous vehicle could transmit the emergency data based on the L2ID of the neighboring vehicle because the L2ID of the neighboring vehicle is associated with the upper identifier of the neighboring vehicle. Similarly, when the emergency data is received from upper layers on the neighboring vehicle, the emergency data could be transited together with the upper identifier of the autonomous vehicle. The neighboring vehicle could transmit the emergency data based on the L2ID of the autonomous vehicle because the L2ID of the autonomous vehicle is associated with the upper identifier of the autonomous vehicle.

Figure 11:
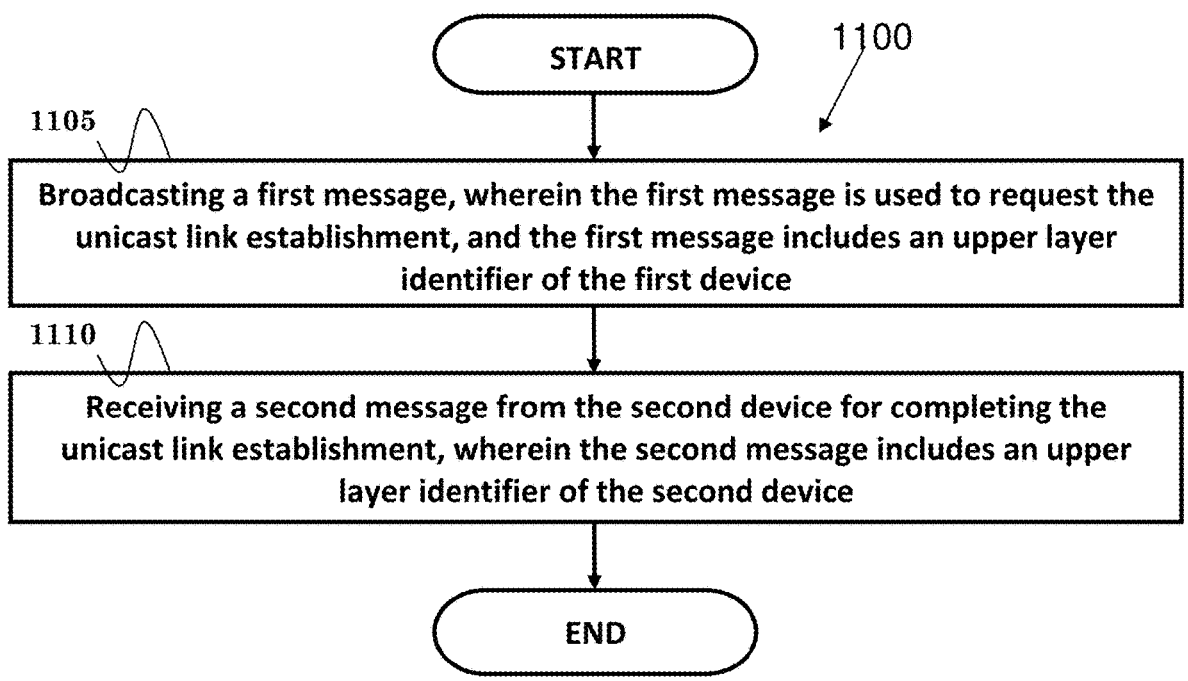
FIG. 11 is a flow chart according to one exemplary embodiment.
Figure 12:
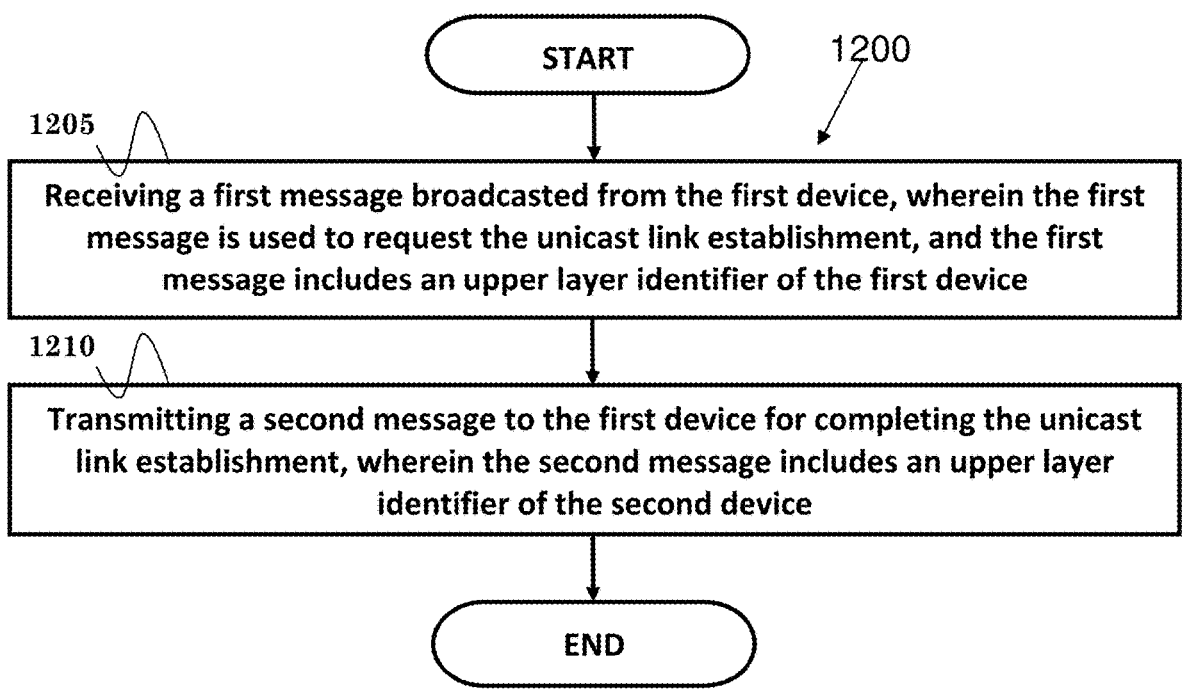
FIG. 12 is a flow chart according to one exemplary embodiment.

FIGS. 11 and 12, and their description below are exemplary embodiments of Solution 2. FIG. 11 is a flow chart 1100 according to one exemplary embodiment from the perspective of a first device to perform a unicast link establishment with a second device. In step 1105, the first device broadcasts a first message, wherein the first message is used to request the unicast link establishment, and the first message includes an upper layer identifier of the first device. In step 1110, the first device receives a second message from the second device for completing the unicast link establishment, wherein the second message includes an upper layer identifier of the second device.

In one embodiment, the first message could be broadcasted and received based on a Layer-2 ID of the first device as a Source Layer-2 ID and a broadcast address as a Destination Layer-2 ID. Furthermore, the second message could be transmitted and received based on a Layer-2 ID of the first device as a Destination Layer-2 ID and a Layer-2 ID of the second device as a Source Layer-2 ID. In another embodiment, the first message does not include any upper layer identifier of the second device.

In one embodiment, the upper layer identifier of the first device could be used for the second device to associate the upper layer identifier of the first device with the Layer-2 ID of the first device. Furthermore, the upper layer identifier of the second device could be used for the first device to associate the upper layer identifier of the second device with the Layer-2 ID of the second device.

Referring back to FIGS. 3 and 4, in one exemplary embodiment of a first device, the device 300 includes a program code 312 stored in the memory 310. The CPU 308 could execute program code 312 to enable the first device (i) to broadcast a first message, wherein the first message is used to request the unicast link establishment, and the first message includes an upper layer identifier of the first device, and (ii) to receive a second message from the second device for completing the unicast link establishment, wherein the second message includes an upper layer identifier of the second device. Furthermore, the CPU 308 can execute the program code 312 to perform all of the above-described actions and steps or others described herein.

FIG. 12 is a flow chart 1200 according to one exemplary embodiment from the perspective of a second device to perform a unicast link establishment with a first device. In step 1205, the second device receives a first message broadcasted from the first device, wherein the first message is used to request the unicast link establishment, and the first message includes an upper layer identifier of the first device. In step 1210, the second device transmits a second message to the first device for completing the unicast link establishment, wherein the second message includes an upper layer identifier of the second device.

In one embodiment, the first message could be broadcasted and received based on a Layer-2 ID of the first device as a Source Layer-2 ID and a broadcast address as a Destination Layer-2 ID. Furthermore, the second message could be transmitted and received based on a Layer-2 ID of the first device as a Destination Layer-2 ID and a Layer-2 ID of the second device as a Source Layer-2 ID. In another embodiment, the first message does not include any upper layer identifier of the second device.

In one embodiment, the upper layer identifier of the first device could be used for the second device to associate the upper layer identifier of the first device with the Layer-2 ID of the first device. Furthermore, the upper layer identifier of the second device could be used for the first device to associate the upper layer identifier of the second device with the Layer-2 ID of the second device.

Referring back to FIGS. 3 and 4, in one exemplary embodiment of a second device, the device 300 includes a program code 312 stored in the memory 310. The CPU 308 could execute program code 312 to enable the second device (i) to receive a first message broadcasted from the first device, wherein the first message is used to request the unicast link establishment, and the first message includes an upper layer identifier of the first device, and (ii) to transmit a second message to the first device for completing the unicast link establishment, wherein the second message includes an upper layer identifier of the second device. Furthermore, the CPU 308 can execute the program code 312 to perform all of the above-described actions and steps or others described herein.

Figure 13:
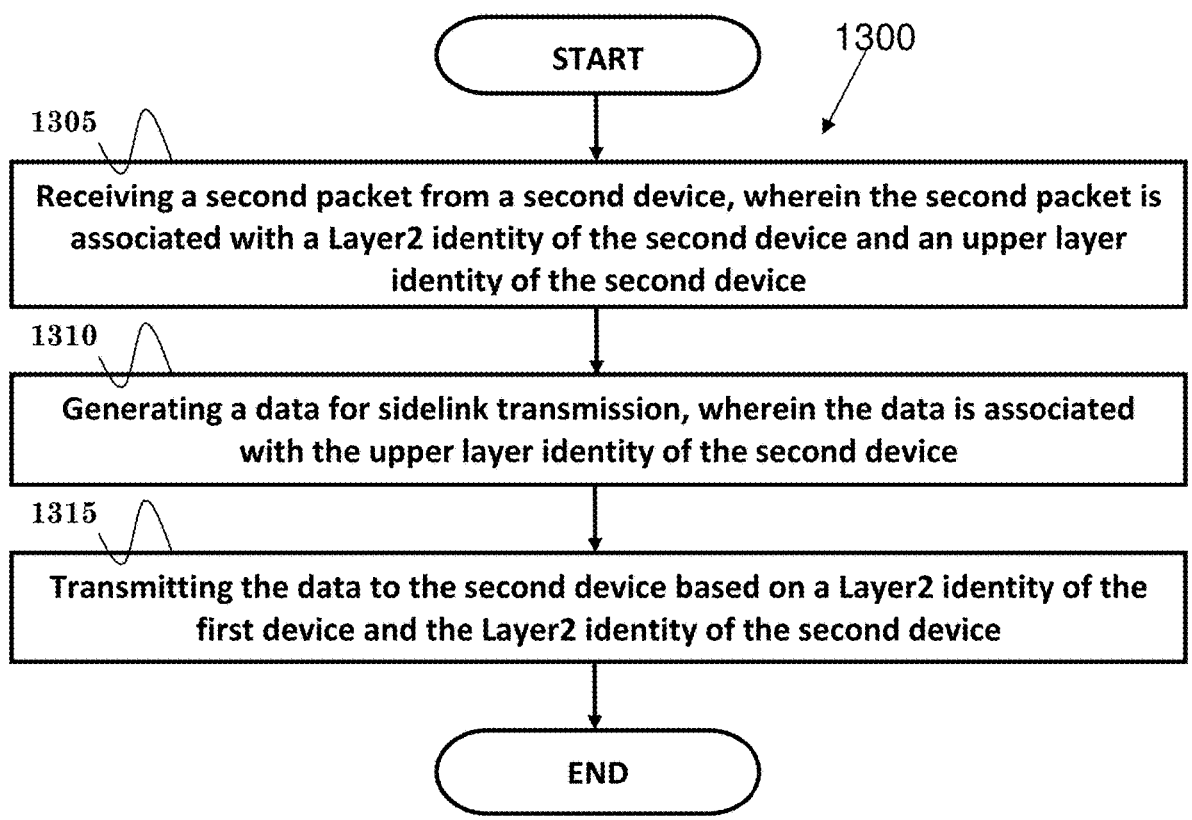
FIG. 13 is a flow chart according to one exemplary embodiment.
Figure 14:
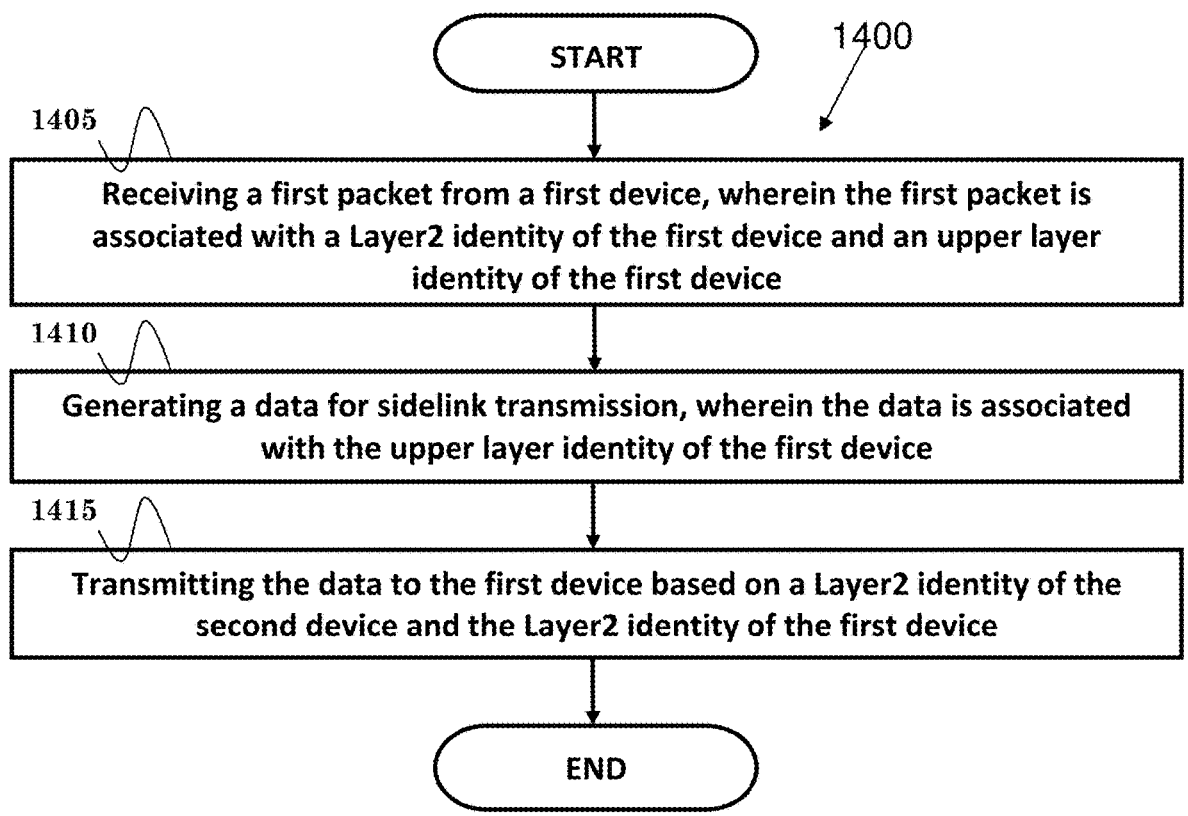
FIG. 14 is a flow chart according to one exemplary embodiment.

FIGS. 13 and 14, and their description below are another exemplary embodiments of Solution 2.

FIG. 13 is a flow chart 1300 according to one exemplary embodiment from the perspective of a first device to perform sidelink communication. In step 1305, the first device receives a second packet from a second device, wherein the second packet is associated with a Layer2 identity of the second device and an upper layer identity of the second device. In step 1310, the first device generates a data for sidelink transmission, wherein the data is associated with the upper layer identity of the second device. In step 1315, the first device transmits the data to the second device based on a Layer2 identity of the first device and the Layer2 identity of the second device.

In one embodiment, the first device could transmit a first packet to the second device, wherein the first packet is associated with the Layer2 identity of the first device and an upper layer identity of the first device.

Referring back to FIGS. 3 and 4, in one exemplary embodiment of a first device, the device 300 includes a program code 312 stored in the memory 310. The CPU 308 could execute program code 312 to enable the first device (i) to receive a second packet from a second device, wherein the second packet is associated with a Layer2 identity of the second device and an upper layer identity of the second device, (ii) to generate a data for sidelink transmission, wherein the data is associated with the upper layer identity of the second device, and (iii) to transmit the data to the second device based on a Layer2 identity of the first device and the Layer2 identity of the second device. Furthermore, the CPU 308 can execute the program code 312 to perform all of the above-described actions and steps or others described herein.

FIG. 14 is a flow chart 1400 according to one exemplary embodiment from the perspective of a second device to perform sidelink communication. In step 1405, the second device receives a first packet from a first device, wherein the first packet is associated with a Layer2 identity of the first device and an upper layer identity of the first device. In step 1410, the second device generates a data for sidelink transmission, wherein the data is associated with the upper layer identity of the first device. In step 1415, the second device transmits the data to the first device based on a Layer2 identity of the second device and the Layer2 identity of the first device.

In one embodiment, the second device could transmit a second packet to the first device, wherein the second packet is associated with the Layer2 identity of the second device and an upper layer identity of the second device.

Referring back to FIGS. 3 and 4, in one exemplary embodiment of a second device, the device 300 includes a program code 312 stored in the memory 310. The CPU 308 could execute program code 312 to enable the second device (i) to receive a first packet from a first device, wherein the first packet is associated with a Layer2 identity of the first device and an upper layer identity of the first device, (ii) to generate a data for sidelink transmission, wherein the data is associated with the upper layer identity of the first device, and (iii) to transmit the data to the first device based on a Layer2 identity of the second device and the Layer2 identity of the first device. Furthermore, the CPU 308 can execute the program code 312 to perform all of the above-described actions and steps or others described herein.

In the context of the embodiments illustrated in FIGS. 13-14 and described above, in one embodiment, the first packet could include a direct request message used for establishing a connection between the first device and the second device. Furthermore, the second packet could include a direct response message used for establishing the connection between the first device and the second device.

In one embodiment, the Layer2 identity of the first device could be included in a header of the first or second packet. Furthermore, the Layer2 identity of the second device could be included in a header of the first or second packet.

In one embodiment, the Layer2 identity of the first device could be transmitted via a sidelink control signaling associated with transmission of the first or second packet. Furthermore, the Layer2 identity of the second device could be transmitted via a sidelink control signaling associated with transmission of the first or second packet.

In one embodiment, the upper layer identity of the first device could be included in the first packet or the direct request message. Furthermore, the upper layer identity of the second device could be included in the second packet or the direct response message.

Solution 3: Connection Establishment can be Coming Up after Transmission of Partial Traffic Since one-to-many direct communication(s) for V2X services (for exchanging position information (e.g. CAM messages)) should have been ongoing among vehicles in proximity before an emergency situation occurs, the autonomous vehicle should be able to identify the right neighboring vehicles via the L2IDs included in the V2X messages received from the one-to-many direct communication(s). Thus, the autonomous vehicle could directly exchange some initial signalling for performing cooperative manoeuvers with the neighboring vehicles based on the L2IDs of the neighboring vehicles.

Figure 15:
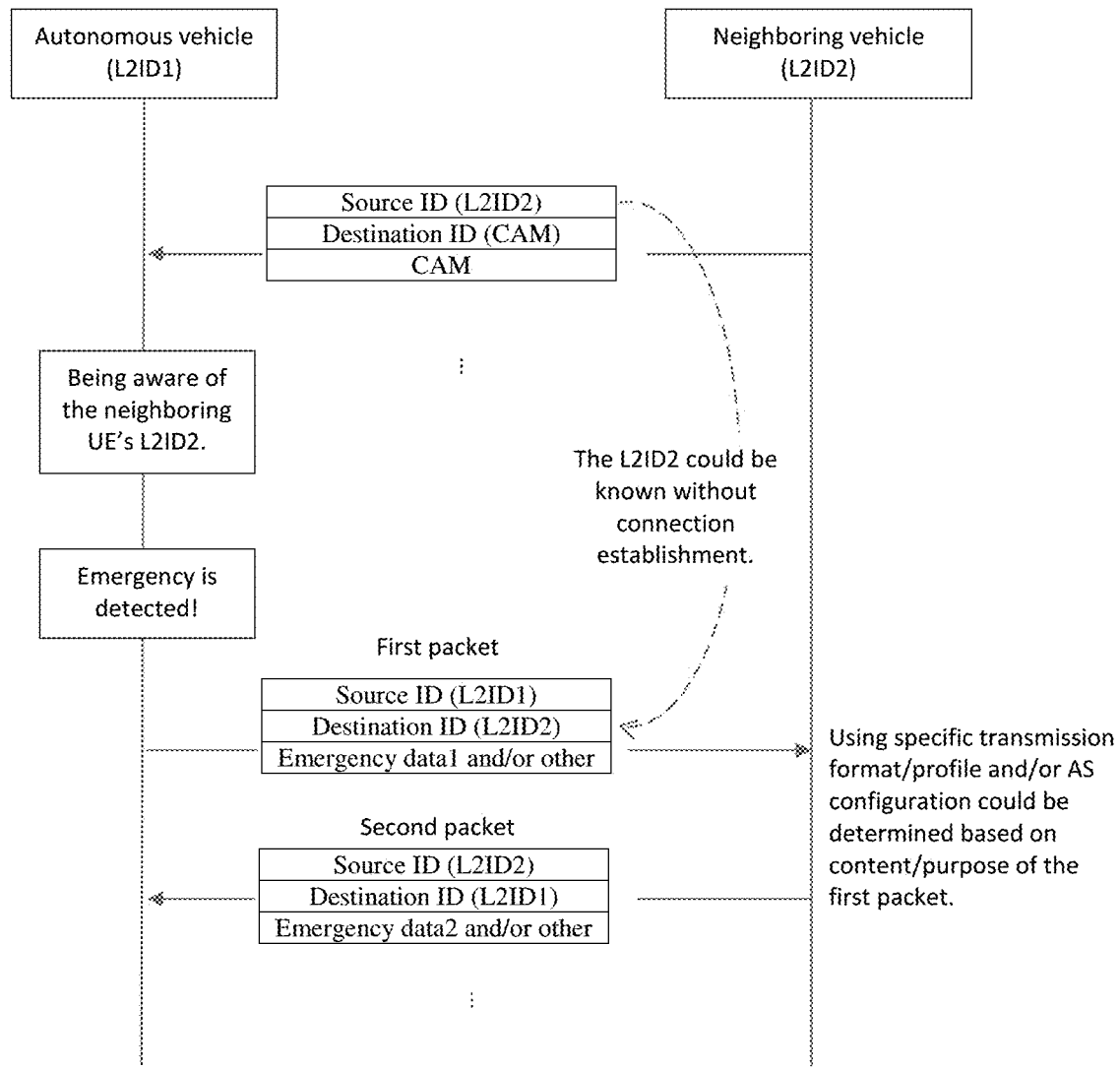
FIG. 15 is a diagram according to one exemplary embodiment.

An example of service flow for this alternative could be illustrated in FIG. 15. The autonomous vehicle could know the L2ID of the neighboring vehicle (L2ID2) based on a broadcast message such as CAM messages sent by the neighboring vehicle. In case the emergency event occurs and the emergency data has become available for transmission, the autonomous vehicle could directly transmit to the neighboring vehicle with the emergency data based on the L2ID of the neighboring vehicle. For example, the autonomous vehicle could transmit to the neighboring vehicle with a first packet which includes a very first data available for transmission after the emergency event occurs. The first packet could be transmitted based on the L2ID of the autonomous vehicle and the L2ID of the neighboring vehicle. The (partial) L2ID of the autonomous vehicle and/or the (partial) L2ID of the neighboring vehicle could be included in a header of the first packet. The (partial) L2ID of the autonomous vehicle and/or the (partial) L2ID of the neighboring vehicle could be transmitted via a sidelink control singling associated with a transmission of the first packet.

In one embodiment, the first packet could be transmitted based on the L2ID of the autonomous vehicle and a groupcast or broadcast address (instead of the L2ID of the neighboring vehicle). The (partial) L2ID of the autonomous vehicle and the (partial) groupcast or broadcast address could be included in a header of the first packet. The (partial) L2ID of the autonomous vehicle and the (partial) groupcast or broadcast address could be transmitted or carried via a sidelink control singling associated with the first packet. The groupcast or broadcast address could be a L2ID used for establishing connection for one-to-one sidelink communication for a/some specific service or a or some specific purpose (e.g. emergency event for V2X service), or a/some specific use case (e.g. "Cooperative Manoeuvers of Autonomous Vehicles for Emergency Situations"). The groupcast or broadcast address could be a common L2ID used for establishing connection for one-to-one sidelink communication for all services or purposes, or all use cases.

In one embodiment, the first packet could include following:
- a first traffic of the emergency event from the autonomous vehicle; and/or
- a direct request message in which the L2ID of the neighboring vehicle could be included (if a groupcast/broadcast address is included in a header of the first packet or transmitted/carried via a sidelink control signalling associated with the first packet), where the direct request message could be used for establishing a connection; and/or
- an information of the L2ID of the neighboring vehicle (if a groupcast/broadcast address is included in a header of the first packet or transmitted/carried via a sidelink control signalling associated with the first packet); and/or
- an information about need of a connection establishment.

In response to reception of the first packet, the neighboring vehicle could initialize or perform a transmission of a second packet to the autonomous vehicle. The second packet could be transmitted based on the L2ID of the autonomous vehicle and the L2ID of the neighboring vehicle. The (partial) L2ID of the autonomous vehicle and the (partial) L2ID of the neighboring vehicle could be included in a header of the second packet. The (partial) L2ID of the autonomous vehicle and the (partial) L2ID of the neighboring vehicle could be transmitted/carried via a sidelink control singling associated with the second packet.

In one embodiment, the second packet could be transmitted based on the L2ID of the neighboring vehicle and a L2ID (e.g. L2ID3) used for groupcast communication in which the autonomous vehicle (and/or the neighboring vehicle) could participate. The (partial) L2ID used for the groupcast communication and the (partial) L2ID of the neighboring vehicle could be included in a header of the second packet. The (partial) L2ID used for the groupcast communication and the (partial) L2ID of the neighboring vehicle could be transmitted or carried via a sidelink control singling associated with the second packet.

In one embodiment, the second packet could include following:
- a second traffic for the emergency event from the neighboring vehicle; and/or
- a second traffic in response to reception of the first traffic included in the first packet; and/or
- a direct request message in which the L2ID of the autonomous vehicle could be included, where the direct request message could be used for establishing a connection; and/or
- an acknowledge information for the first traffic included in the first packet, where the acknowledge information could be used for the autonomous vehicle to determine if the first traffic included the first packet is needed to be retransmitted. The acknowledge information could be a HARQ (Hybrid Automatic Repeat Request) feedback, a ARQ feedback, a status report of a RLC (Radio Link Control) control PDU (Protocol Data Unit), a status report of a PDCP (Packet Data Convergence Protocol) control PDU or a signalling of a upper or application layer which constructs, generates, delivers, or transmits the first traffic included in the first packet.

Since some use cases (e.g. emergency situations) are quite urgent and critical, a specific transmission format or profile and/or a specific AS (Access Stratum) configuration used for sidelink communication for such use cases could be different from a common transmission format/profile and/or a common AS configuration used for sidelink communication for other use cases (not so urgent or critical).

The autonomous vehicle could use the specific transmission format or profile to transmit the first packet. The neighboring vehicle could (try to) use the common transmission format or profile or the specific transmission format or profile to receive the first packet. If the first packet is received based on the specific transmission format or profile, the neighboring vehicle could use the specific transmission format or profile to transmit the second packet. The autonomous vehicle could use the specific transmission format or profile to receive the second packet (because the first packet was transmitted based the specific transmission format or profile).

Alternatively, the autonomous vehicle could use the common transmission format or profile to transmit the first packet. The neighboring vehicle could use the common transmission format or profile to receive the first packet. And the neighboring vehicle could use a use the specific transmission format or profile to transmit the second packet (based on e.g. content or purpose of the first packet). The autonomous vehicle could use the specific transmission format or profile to receive the second packet (because the autonomous vehicle may expect that the neighboring could transmit the second packet based the specific transmission format/profile).

In one embodiment, the autonomous vehicle could use the specific AS configuration to transmit the first packet. The neighboring vehicle could (try to) use the common AS configuration or the specific AS configuration to receive the first packet. If the first packet is received based on the specific AS configuration, the neighboring vehicle could use the specific AS configuration to transmit the second packet. The autonomous vehicle could use the specific AS configuration to receive the second packet (because the first packet was transmitted based the specific AS configuration).

Alternatively, the autonomous vehicle could use the common AS configuration to transmit the first packet. The neighboring vehicle could use the common AS configuration to receive the first packet. And the neighboring vehicle could use a use the specific AS configuration to transmit the second packet (based on e.g. content or purpose of the first packet). The autonomous vehicle could use the specific AS configuration to receive the second packet (because the autonomous vehicle may expect that the neighboring could transmit the second packet based the specific AS configuration).

The specific AS configuration could include following:
- MAC (Medium Access Control) configuration (e.g. whether HARQ retransmission is needed, number of retransmission, MCS (Modulation Coding Scheme), etc.); and/or
- RLC configuration (e.g. an information about whether RLC AM entity is used); and/or
- PDCP configuration (e.g. an information about whether PDCP packet duplication should be activated); and/or
- SDAP (Service Data Adaptation Protocol) configuration (e.g. an information about whether SPAP header is needed in a SDAP PDU, mapping of SLRBs and QoS flows, etc.).

Regardless of any methods mentioned above, the transmission format or profile can indicate one or multiple AS layer transmission parameters. In one embodiment, the transmission format or profile could indicate one or multiple RATs (Radio Access Technology), one or multiple MCS, one or multiple subcarrier spacing, one or multiple carriers, one or multiple bandwidth parts, one or multiple transmission formats, one or multiple transmission power limitations, and/or one or multiple transmission ranges. Furthermore, the transmission format or profile could indicate HARQ adaptation, corresponding MCS, corresponding (maximum or minimum) TB size, and/or transmission mode (e.g. network scheduling mode, UE autonomous resource selection mode).

Regardless of any methods mentioned above, the AS configuration could include MAC configuration relevant parameters, RLC configuration relevant parameters, PDCP configuration relevant parameters, and/or SDAP configuration relevant parameters.

FIGS. 14 and 15, and their description below are exemplary embodiments of Solution 3.

Figure 16:
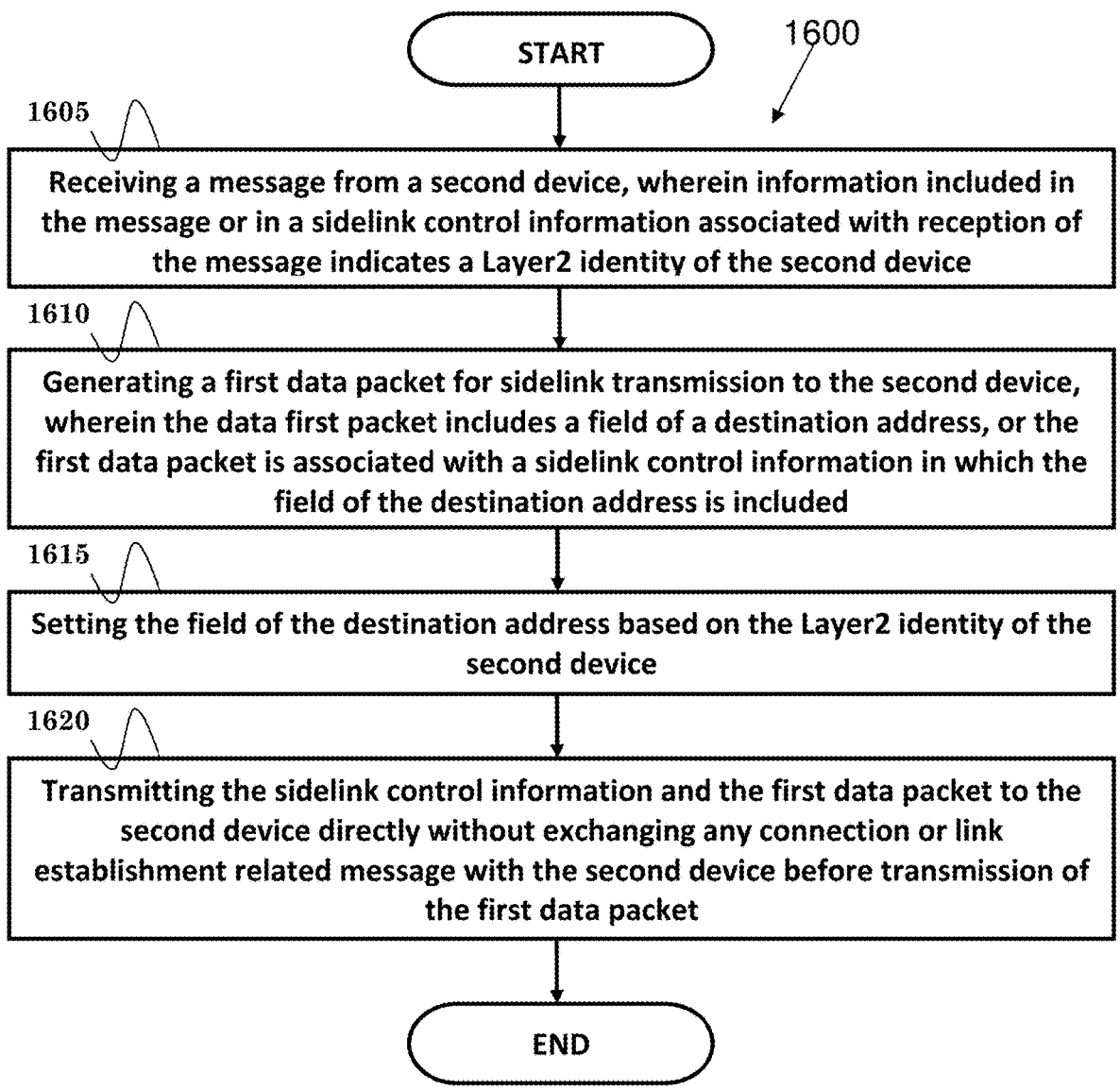
FIG. 16 is a flow chart according to one exemplary embodiment.

FIG. 16 is a flow chart 1600 according to one exemplary embodiment from the perspective of a first device to perform connection-less one-to-one sidelink communication. In step 1605, the first device receives a message from a second device, wherein information included in the message or in a sidelink control information associated with reception of the message indicates a Layer2 identity of the second device. In step 1610, the first device generates a first data packet for sidelink transmission to the second device, wherein the data first packet includes a field of a destination address, or the first data packet is associated with a sidelink control information in which the field of the destination address is included. In step 1615, the first device sets the field of the destination address based on the Layer2 identity of the second device. In step 1620, the first device transmits the sidelink control information and the first data packet to the second device directly without exchanging any connection or link establishment related message with the second device before transmission of the first data packet.

Referring back to FIGS. 3 and 4, in one exemplary embodiment of a UE, the device 300 includes a program code 312 stored in the memory 310. The CPU 308 could execute program code 312 to enable the UE (i) to receive a message from a second device, wherein information included in the message or in a sidelink control information associated with reception of the message indicates a Layer2 identity of the second device, (ii) to generate a first data packet for sidelink transmission to the second device, wherein the data first packet includes a field of a destination address, or the first data packet is associated with a sidelink control information in which the field of the destination address is included, (iii) to set the field of the destination address based on the Layer2 identity of the second device, and (iv) to transmit the sidelink control information and the first data packet to the second device directly without exchanging any connection or link establishment related message with the second device before transmission of the first data packet. Furthermore, the CPU 308 can execute the program code 312 to perform all of the above-described actions and steps or others described herein.

Figure 17:
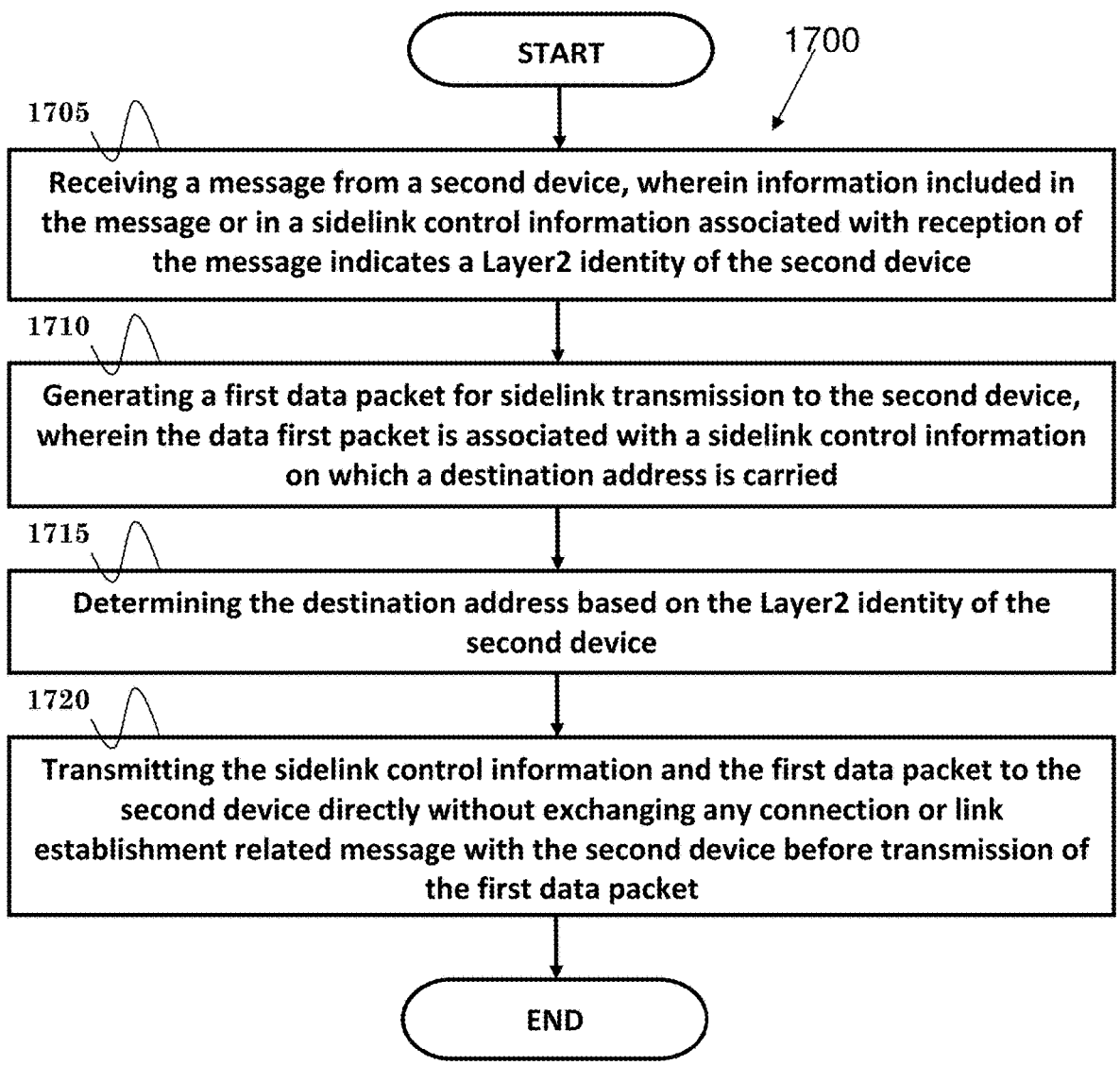
FIG. 17 is a flow chart according to one exemplary embodiment.

FIG. 17 is a flow chart 1700 according to one exemplary embodiment from the perspective of a first device to perform connection-less one-to-one sidelink communication. In step 1705, the first device receives a message from a second device, wherein information included in the message or in a sidelink control information associated with reception of the message indicates a Layer2 identity of the second device. In step 1710, the first device generates a first data packet for sidelink transmission to the second device, wherein the data first packet is associated with a sidelink control information on which a destination address is carried. In step 1715, the first device determines the destination address based on the Layer2 identity of the second device. In step 1720, the first device transmits the sidelink control information and the first data packet to the second device directly without exchanging any connection or link establishment related message with the second device before transmission of the first data packet.

Referring back to FIGS. 3 and 4, in one exemplary embodiment of a first device, the device 300 includes a program code 312 stored in the memory 310. The CPU 308 could execute program code 312 to enable the first device (i) to receive a message from a second device, wherein information included in the message or in a sidelink control information associated with reception of the message indicates a Layer2 identity of the second device, (ii) to generate a first data packet for sidelink transmission to the second device, wherein the data first packet is associated with a sidelink control information on which a destination address is carried, (iii) to determines the destination address based on the Layer2 identity of the second device, and (iv) to transmit the sidelink control information and the first data packet to the second device directly without exchanging any connection or link establishment related message with the second device before transmission of the first data packet. Furthermore, the CPU 308 can execute the program code 312 to perform all of the above-described actions and steps or others described herein.

In the context of the embodiments illustrated in FIGS. 16 and 17 and described above, in one embodiment, the first device could receive a second data packet from the second device, wherein the second data packet includes another data for transmission from the second device to the first device. Furthermore, the first device could receive a second packet from the second device, wherein the second packet includes a direct request message used for establishing a connection between the first device and the second device. In addition, the first device could receive a second packet from the second device, wherein the second packet includes an acknowledgement information used for the first device to determine if retransmission of the data included in the first packet is needed.

In one embodiment, the message could be a V2V or V2X message (e.g. CAM message). Furthermore, the message could be received via a one-to-many sidelink communication.

In one embodiment, the first data packet may not include a direct request message used for establishing a connection between the first device and the second device. The Layer2 identity of the second device could be included in a header of a packet including the message.

Figure 18:
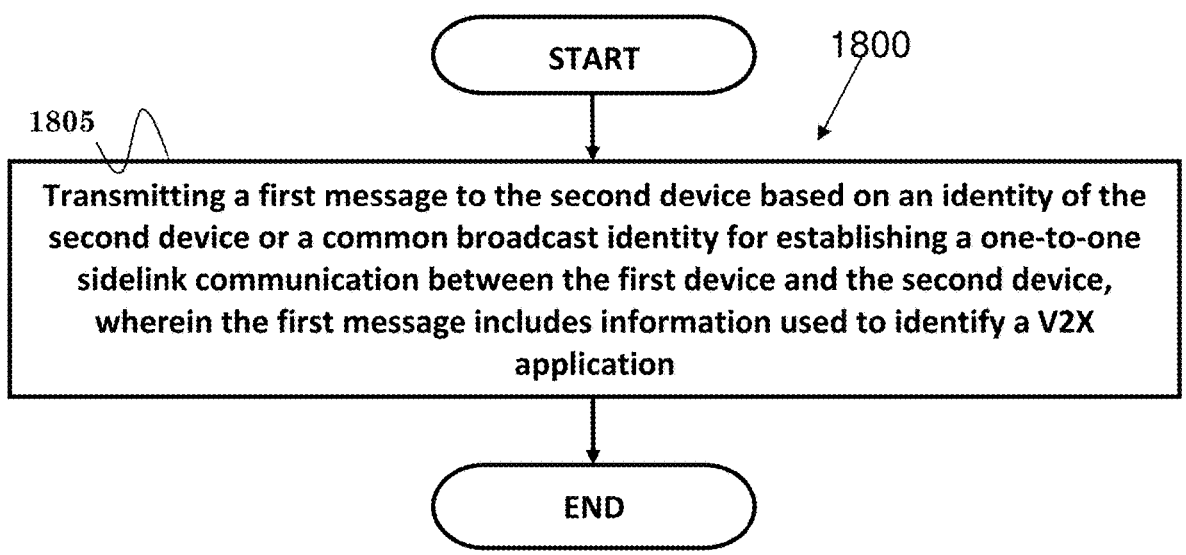
FIG. 18 is a flow chart according to one exemplary embodiment.
Figure 19:
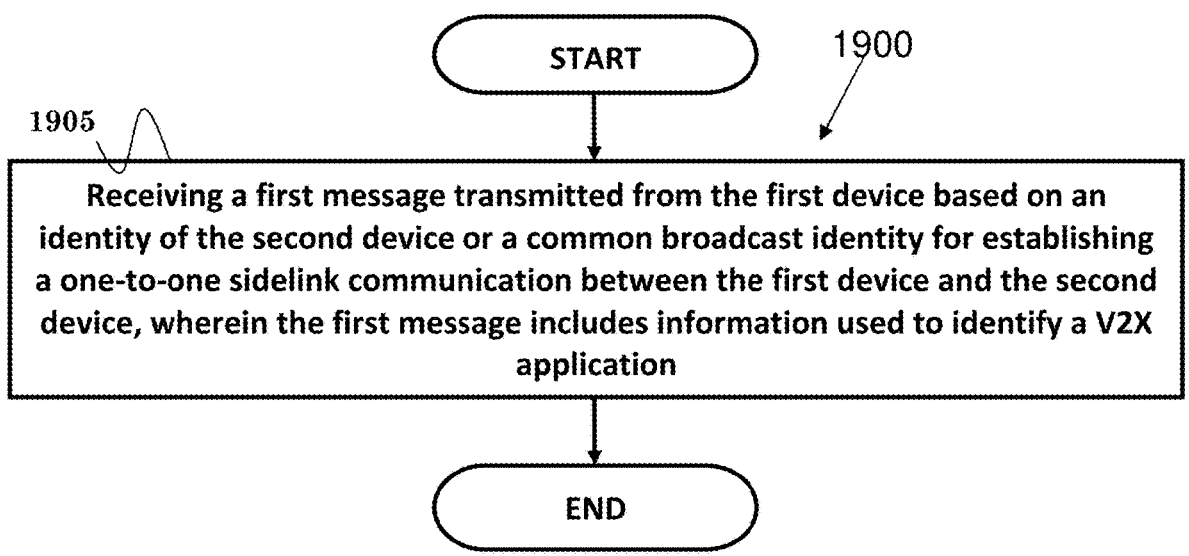
FIG. 19 is a flow chart according to one exemplary embodiment.

In one scenario, a one-to-one sidelink communication may be initiated by a V2X application in UE1 toward UE2 when necessary. There is a need for UE1 to inform UE2 of the V2X application during the connection or link establishment procedure for the one-to-one sidelink communication so that the subsequent data packet received from UE1 can be processed by the right V2X application in UE2. Information indicating an identity of the V2X application may be included in the Direct Communication Request message. By this way, an identity information included in a packet used to transmit the Direct Communication Request message or in a sidelink control information associated with transmission or reception of the packet could indicate a common Layer2 broadcast identity. The common Layer2 broadcast identity could be used for connection or link establishment procedure for the one-to-one sidelink communication (for any V2X application). FIGS. 18 and 19 and their description below are exemplary embodiments.

FIG. 18 is a flow chart 1800 according to one exemplary embodiment from the perspective of a first device to establish a one-to-one sidelink communication with a second device. In step 1805, the first device transmits a first message to the second device based on an identity of the second device or a common broadcast identity for establishing a one-to-one sidelink communication between the first device and the second device, wherein the first message includes information used to identify a V2X application.

Referring back to FIGS. 3 and 4, in one exemplary embodiment of a first device, the device 300 includes a program code 312 stored in the memory 310. The CPU 308 could execute program code 312 to enable the first device to transmit a first message to the second device based on an identity of the second device or a common broadcast identity for establishing a one-to-one sidelink communication between the first device and the second device, wherein the first message includes information used to identify a V2X application. Furthermore, the CPU 308 can execute the program code 312 to perform all of the above-described actions and steps or others described herein.

FIG. 19 is a flow chart 1900 according to one exemplary embodiment from the perspective of a second device to establish a one-to-one sidelink communication with a first device. In step 1905, the second device receives a first message transmitted from the first device based on an identity of the second device or a common broadcast identity for establishing a one-to-one sidelink communication between the first device and the second device, wherein the first message includes information used to identify a V2X application.

Referring back to FIGS. 3 and 4, in one exemplary embodiment of a second device, the device 300 includes a program code 312 stored in the memory 310. The CPU 308 could execute program code 312 to enable the second (i) to receive a first message transmitted from the first device based on an identity of the second device or a common broadcast identity for establishing a one-to-one sidelink communication between the first device and the second device, wherein the first message includes information used to identify a V2X application. Furthermore, the CPU 308 can execute the program code 312 to perform all of the above-described actions and steps or others described herein.

In the context of the embodiments illustrated in FIGS. 18 and 19 and described above, in one embodiment, the first message could be a Direct Communication Request message. Furthermore, a second message could be transmitted from the second device to the first device for mutual authentication in response to reception of the first message. The first message could include an identity of the first device and an identity of the second device.

In one embodiment, a sidelink control information associated with transmission or reception of the first message could indicate the identity of the second device. The information could be an identity of the V2X application. The V2X application in the first device could trigger establishment of the one-to-one sidelink communication.

In one embodiment, the common broadcast identity could be a common Layer2 broadcast identity. The first message could include the common broadcast identity. A sidelink control information associated with transmission or reception of the first message could indicate the common broadcast identity.

Regardless of any methods mentioned above, the connection for one-to-one sidelink communication could be a AS level link between both devices/vehicles and/or a RRC connection between both devices/vehicles.

Regardless of any methods mentioned above, the device could be a UE or a vehicle.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first device to perform a unicast link establishment with a second device, comprising:
   broadcasting a first message, wherein the first message is used to request the unicast link establishment, and the first message includes an upper layer identifier of the first device and is broadcasted based on a Layer-2 ID of the first device as a Source Layer-2 ID and a broadcast address as a Destination Layer-2 ID; and
   receiving a second message from the second device for completing the unicast link establishment, wherein the second message includes an upper layer identifier of the second device and is received based on a Layer-2 ID of the first device as a Destination Layer-2 ID and a Layer-2 ID of the second device as a Source Layer-2 ID.

2. The method of claim 1, wherein the upper layer identifier of the first device is used for the second device to associate the upper layer identifier of the first device with the Layer-2 ID of the first device.

3. The method of claim 1, wherein the first message does not include any upper layer identifier of the second device.

4. A method for a second device to perform a unicast link establishment with a first device, comprising:
   receiving a first message broadcasted from the first device, wherein the first message is used to request the unicast link establishment, and the first message includes an upper layer identifier of the first device and is received based on a Layer-2 ID of the first device as a Source Layer-2 ID and a broadcast address as a Destination Layer-2 ID; and
   transmitting a second message to the first device for completing the unicast link establishment, wherein the second message includes an upper layer identifier of the second device and is transmitted based on a Layer-2 ID of the first device as a Destination Layer-2 ID and a Layer-2 ID of the second device as a Source Layer-2 ID.

5. The method of claim 4, wherein the upper layer identifier of the first device is used for the second device to associate the upper layer identifier of the first device with the Layer-2 ID of the first device.

6. The method of claim 4, wherein the first message does not include any upper layer identifier of the second device.

7. A first communication device, comprising:
   a control circuit;
   a processor installed in the control circuit; and
   a memory installed in the control circuit and operatively coupled to the processor;
   wherein the processor is configured to execute a program code stored in the memory to:
      broadcast a first message, wherein the first message is used to request the unicast link establishment, and the first message includes an upper layer identifier of the first communication device and is broadcasted based on a Layer-2 ID of the first communication device as a Source Layer-2 ID and a broadcast address as a Destination Layer-2 ID; and
      receive a second message from a second communication device for completing the unicast link establishment, wherein the second message includes an upper layer identifier of the second communication device and is received based on a Layer-2 ID of the first communication device as a Destination Layer-2 ID and a Layer-2 ID of the second communication device as a Source Layer-2 ID.

8. The first communication device of claim 7, wherein the upper layer identifier of the first communication device is used for the second communication device to associate the upper layer identifier of the first communication device with the Layer-2 ID of the first communication device.

9. The first communication device of claim 7, wherein the first message does not include any upper layer identifier of the second communication device.

10. A second communication device, comprising:
   a control circuit;
   a processor installed in the control circuit; and
   a memory installed in the control circuit and operatively coupled to the processor;
   wherein the processor is configured to execute a program code stored in the memory to:
      receive a first message broadcasted from a first communication device, wherein the first message is used to request the unicast link establishment, and the first message includes an upper layer identifier of the first communication device and is received based on a Layer-2 ID of the first communication device as a Source Layer-2 ID and a broadcast address as a Destination Layer-2 ID; and transmit a second message to the first communication device for completing the unicast link establishment, wherein the second message includes an upper layer identifier of the second communication device and is transmitted based on a Layer-2 ID of the first communication device as a Destination Layer-2 ID and a Layer-2 ID of the second communication device as a Source Layer-2 ID.

11. The second communication device of claim 10, wherein the upper layer identifier of the first communication device is used for the second communication device to associate the upper layer identifier of the first communication device with the Layer-2 ID of the first communication device.

12. The second communication device of claim 10, wherein the first message does not include any upper layer identifier of the second communication device.

* * * * *